US 10,731,847 B2

(12) United States Patent
Axelbaum et al.

(10) Patent No.: US 10,731,847 B2
(45) Date of Patent: Aug. 4, 2020

(54) RADIANT BOILER FOR PRESSURIZED OXY-COMBUSTION AND METHOD OF RADIANT TRAPPING TO CONTROL HEAT FLUX IN HIGH TEMPERATURE PARTICLE-LADEN FLOWS AT ELEVATED PRESSURE

(71) Applicant: WASHINGTON UNIVERSITY, St. Louis, MO (US)

(72) Inventors: Richard Axelbaum, St. Louis, MO (US); Fei Xia, St. Louis, MO (US); Benjamin Kumfer, St. Louis, MO (US)

(73) Assignee: Washington University, St. Louis, MO (US)

( * ) Notice: Subject to any disclaimer, the term of this patent is extended or adjusted under 35 U.S.C. 154(b) by 87 days.

(21) Appl. No.: 15/541,229

(22) PCT Filed: Dec. 30, 2015

(86) PCT No.: PCT/US2015/068036
§ 371 (c)(1),
(2) Date: Jun. 30, 2017

(87) PCT Pub. No.: WO2016/109650
PCT Pub. Date: Jul. 7, 2016

(65) Prior Publication Data
US 2017/0363284 A1 Dec. 21, 2017

Related U.S. Application Data

(60) Provisional application No. 62/098,038, filed on Dec. 30, 2014.

(51) Int. Cl.
*F22B 1/28* (2006.01)
*F23N 3/00* (2006.01)
(Continued)

(52) U.S. Cl.
CPC ............... *F22B 1/282* (2013.01); *F22B 1/22* (2013.01); *F22B 1/26* (2013.01); *F23C 6/045* (2013.01);
(Continued)

(58) Field of Classification Search
CPC ..................................................... F22B 1/282
See application file for complete search history.

(56) References Cited

U.S. PATENT DOCUMENTS 1,754,102 A * 4/1930 Harding .................... F24H 1/26
122/125
1,821,981 A * 9/1931 Merz ........................ F22B 13/00
122/166.1
(Continued)

FOREIGN PATENT DOCUMENTS

CA 2646171 A1 6/2010
CH 196312 A 3/1938
(Continued)

OTHER PUBLICATIONS

European Patent Office Search Report and Written Opinion for application No. 15876244.3, dated Oct. 16, 2018, 7 pages.
(Continued)

*Primary Examiner* — Nathaniel Herzfeld
(74) *Attorney, Agent, or Firm* — Armstrong Teasdale LLP

(57) ABSTRACT

A boiler has a shell surrounding a vertical centerline. The shell defines an inner surface having an inner diameter and an inner length extending between an upper upstream end and a lower downstream end. The inner surface defines a hollow interior, the boiler having a pre-combustion zone, a combustion zone downstream from the pre-combustion zone, and a post-combustion zone downstream from the combustion zone. The shell is tapered outward along its length in at least a portion of the combustion zone. An
(Continued)

oxidizer inlet is in fluid communication with the pre-combustion zone, and a fuel nozzle introduces fuel into the combustion zone. A tube assembly is mounted in the hollow interior of the shell for transferring heat to fluid flowing through the tube assembly. A flue duct is in fluid communication with the post-combustion zone for transporting flue gases from the hollow interior.

16 Claims, 12 Drawing Sheets

(51) Int. Cl.
| | |
|---|---|
| *F22B 1/22* | (2006.01) |
| *F23C 6/04* | (2006.01) |
| *F23L 7/00* | (2006.01) |
| *F23J 15/06* | (2006.01) |
| *F22B 1/26* | (2006.01) |
| *F23N 3/08* | (2006.01) |
| *F24H 1/00* | (2006.01) |
| *F23B 30/00* | (2006.01) |

(52) U.S. Cl.
CPC .............. *F23J 15/06* (2013.01); *F23L 7/007* (2013.01); *F23N 3/00* (2013.01); *F23N 3/087* (2013.01); *F24H 1/0063* (2013.01); *F23B 5/02* (2013.01); *F23J 2219/70* (2013.01); *Y02E 20/344* (2013.01); *Y02E 20/363* (2013.01)

(56) References Cited

U.S. PATENT DOCUMENTS

| | | | | |
|---|---|---|---|---|
| 1,830,635 A | * | 11/1931 | Bierbower | ................ F24H 1/36 |
| | | | | 122/115 |
| 1,948,940 A | | 2/1934 | Gustav | |
| 2,968,288 A | * | 1/1961 | Daman | ..................... F23C 6/00 |
| | | | | 122/240.3 |
| 3,948,223 A | * | 4/1976 | Benson | ................... F22B 33/00 |
| | | | | 122/240.2 |
| 4,145,178 A | * | 3/1979 | Egnell | ........................ F23C 6/04 |
| | | | | 431/11 |
| 4,725,222 A | * | 2/1988 | Koch | ...................... F23C 6/047 |
| | | | | 422/177 |
| 4,782,765 A | | 11/1988 | Miller et al. | |
| 6,116,196 A | * | 9/2000 | Watanabe | ............... F24H 1/403 |
| | | | | 122/235.11 |
| 6,318,305 B1 | * | 11/2001 | Takubo | ................. F22B 21/065 |
| | | | | 122/235.11 |
| 2010/0212603 A1 | * | 8/2010 | Ookubo | ................ F22B 21/065 |
| | | | | 122/13.01 |
| 2014/0007576 A1 | * | 1/2014 | Alekseev | ................ F01K 17/06 |
| | | | | 60/648 |
| 2015/0013300 A1 | | 1/2015 | Axelbaum | |

FOREIGN PATENT DOCUMENTS

| | | |
|---|---|---|
| EP | 2772619 A1 | 9/2014 |
| RU | 2318164 C2 | 2/2008 |
| RU | 2319018 C1 | 3/2008 |
| RU | 115050 U1 | 5/2012 |
| UA | 90596 U | 6/2014 |
| WO | 2007140261 A2 | 12/2007 |
| WO | 2007140261 A3 | 2/2008 |

OTHER PUBLICATIONS

International Search Report and Written Opinion for International Application No. PCT/US2015/068036, dated Apr. 7, 2016, 7 pages.

* cited by examiner

Figure 8 Temperature (K) distributions of SPOC design for stages 1-4

Figure 9 Wall heat flux (W/m²) for Stages 1-4

Figure 10 Temperature (K) contours of stages 1 for (a) with buoyancy (b) without buoyancy Figure 11. Wall heat flux (W/m²) for cases (a) with buoyancy – downfired, and (b) without buoyancy Figure 12 Velocity vector (m/s) profiles for cases (a) with buoyancy, and (b) without buoyancy

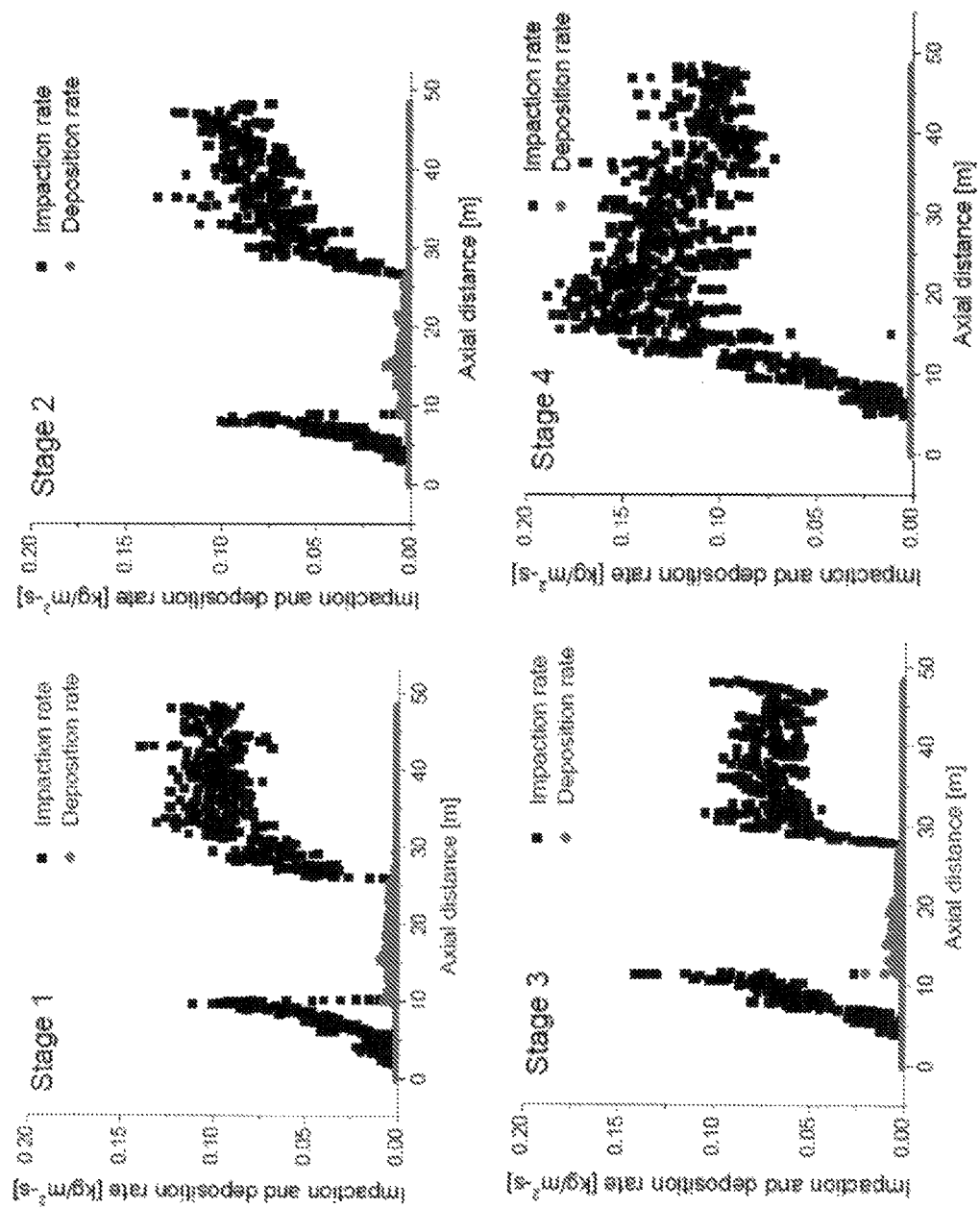
Figure 13 Particle impaction and deposition rate based on new capture criterion for Stages 1-4

RADIANT BOILER FOR PRESSURIZED OXY-COMBUSTION AND METHOD OF RADIANT TRAPPING TO CONTROL HEAT FLUX IN HIGH TEMPERATURE PARTICLE-LADEN FLOWS AT ELEVATED PRESSURE

This application is a 35 U.S.C. § 371 national stage application of PCT Application No. PCT/US2015/068036, filed Dec. 30, 2015, which claims the benefit of U.S. Provisional Application No. 62/098,038, filed Dec. 30, 2014, both of which are hereby incorporated by reference herein in their entirety.

STATEMENT REGARDING FEDERALLY SPONSORED RESEARCH & DEVELOPMENT

This invention was made with government support under grant no. DE FE0009702 awarded by the Department of Energy. The government has certain rights in the invention.

BACKGROUND

The field of the invention relates generally to power generation, and more particularly, to a method and apparatus for reducing carbon dioxide ($CO_2$) when generating power from carbon-based fuels.

Most power generation is provided by heating a working fluid, such as water to produce steam, and using the heated fluid to turn a turbine connected to a generator, which produces electricity. A boiler is typically used to heat the working fluid. Conventional boilers burn fuel, such as coal, thereby producing a flame that heats working fluid flowing through tubes disposed within the boiler. The heat energy transferred to the working fluid turns the turbine, which turns the generator connected to the turbine. The working fluid cools as it passes through the turbine. Frequently, the working fluid is directed back through the tubes in the boiler where it is reheated and used again to turn the turbine. Because carbon-based fuels are inexpensive relative to other heat sources, they are frequently used in the boiler. One drawback of using carbon-based fuels is that they produce emissions such as $CO_2$ when they burn.

One way of reducing $CO_2$ emissions from carbon-based power generation is oxy-combustion, in which fuel is burning in an environment of oxygen and recycled flue gas to produce high purity $CO_2$. In the past, oxy-combustion has been performed at atmospheric pressure and recycled flue gas was regulated to control flame temperature and heat transfer rate in the boiler yielding conditions similar to conventional air-fired boilers. Conventional oxy-combustion is costly and inefficient due to a need to produce oxygen for the process, as well as, a need to compress and purify emitted $CO_2$ before use or disposal.

To reduce cost and increase efficiency associated with capturing and pressurizing $CO_2$, some have suggested burning the fuel in a pressurized atmosphere. Prior pressurized oxy-combustion systems have heated the working fluid with flue gas using a convective heat exchanger (e.g., heat recover steam generator). The tubes in the heat exchanger carrying the working fluid are separated from the burning fuel so the working fluid is not radiantly heated by the flame. In these systems, flue gas is recycled to cool the flue gas entering the heat exchanger to prevent damage to the tubes due to excess gas temperatures. Recycling flue gas results in losses in power plant efficiency. Prior systems required recycled flue gas or inert gas in practice to prevent the heat exchanger from exceeding safe operating temperatures.

Accordingly, there continues to be a need for an oxy-combustion system having increased efficiencies and lower operating costs.

SUMMARY

In one aspect, a boiler system generally comprises a series of boilers. Each boiler includes a generally cylindrical shell surrounding a vertical centerline. The shell defines an inner surface having an inner diameter and an inner length extending between an upper upstream end and a lower downstream end. The inner surface defines a hollow interior suitable for withstanding pressure greater than ambient. The interior has a pre-combustion zone, a combustion zone downstream from the pre-combustion zone, and a post-combustion zone downstream from the combustion zone. At least the combustion zone in the hollow interior of each boiler is encircled by a plurality of boiler tubes in a tube assembly interior to the inner surface of the cylindrical shell. Each boiler includes an oxidizer inlet entering the pre-combustion zone of the hollow interior adjacent the upstream end of the shell. Each boiler also has a flow distributor mounted in the hollow interior of the shell downstream from oxidizer inlet adapted to provide oxidizer flowing downstream from the distributor with an even radial flow distribution, with an even circumferential flow distribution, and with a ratio of circular momentum to axial momentum of less than about 0.2. In addition, each boiler includes a fuel nozzle positioned adjacent the upstream end of the shell for introducing fuel into the combustion zone of the hollow interior of the shell along the centerline and downstream from the flow distributor. Further, each boiler has a flue duct connected to the shell adjacent the downstream end for transporting flue gas from the hollow interior. Oxygen is delivered to the first boiler in the series through the oxidizer inlet of the first boiler. Flue gas from the immediately preceding boiler in the series is delivered through the oxidizer inlet of each boiler subsequent to the first boiler in the series.

In another aspect, a boiler system generally comprises a series of boilers. Each of the boilers includes a shell having an upstream end, a downstream end opposite the upstream end, and a hollow interior. The boilers also have an oxidizer inlet entering the hollow interior adjacent the upstream end of the shell and a fuel nozzle positioned adjacent the upstream end of the shell for introducing fuel into the hollow interior of the shell. Each boiler has a flue duct connected to the shell adjacent the downstream end for transporting flue gas from the hollow interior. Oxygen is delivered to the oxidizer inlet of the first boiler in the series. Flue gas from the immediately preceding boiler in the series is delivered through the oxidizer inlet of each boiler subsequent to the first boiler in the series.

In still another aspect, a boiler generally comprises a generally cylindrical shell surrounding a vertical centerline. The shell defines an inner surface having an inner diameter and an inner length extending between an upper upstream end and a lower downstream end. The inner surface defines a hollow interior suitable for withstanding pressure greater than ambient. The interior has a precombustion zone, a combustion zone downstream from the pre-combustion zone, and a post-combustion zone downstream from the combustion zone. The boiler also includes an oxidizer inlet entering the pre-combustion zone of the hollow interior adjacent the upstream end of the shell. In addition, the boiler includes a flow distributor mounted in the hollow interior of the shell downstream from oxidizer inlet adapted to provide oxidizer flowing downstream from the distributor with an even radial flow distribution, with an even circumferential flow distribution, and with a ratio of circumferential momentum to axial momentum of less than about 0.2. The boiler has a fuel nozzle positioned adjacent the upstream end of the shell for introducing fuel into the combustion zone of the hollow interior of the shell along the centerline and downstream from the flow distributor. Further, the boiler includes a tube assembly mounted in the combustion zone and post-combustion zone of the hollow interior of the shell for transferring heat to fluid flowing through the assembly. The tube assembly has an upstream inner diameter surrounding the combustion zone and a downstream inner diameter surrounding the postcombustion zone. The downstream inner diameter is smaller than the upstream inner diameter. The boiler also has a flue duct connected to the shell adjacent the downstream end for transporting flue gases from the hollow interior.

In yet another aspect, a method of processing carbon-based byproducts when burning carbon-containing fuel generally comprises cooling flue gas discharged from the final boiler in a series of pressurized boilers using boiler feed water to a temperature selected to prevent acid condensation. The cooled flue gas is filtered and fed into a top of a direct contact cooler at a rate selected to promote rate-limiting reactions. The method also includes introducing filtered flue gas through a bottom of the direct contact cooler to remove $SO_2$ and $NO_x$ by conversion to dilute sulfuric and nitric acid.

In yet a further aspect, a method of reducing carbon-based byproducts when burning carbon-containing fuel generally comprises introducing an oxidizer to an upstream boiler and introducing carbon-containing fuel to the upstream boiler. The oxidizer and carbon-containing fuel are burned in the upstream boiler. Flue gas emitted from the upstream boiler is transported to a downstream boiler. The method also includes introducing the flue gas to the downstream boiler for use as an oxidizer and introducing carbon-containing fuel to the downstream boiler. The flue gas and carbon-containing fuel are burned in the downstream boiler.

In still a further aspect, a boiler generally comprises a shell surrounding a vertical centerline. The shell defines an inner surface having an inner diameter and an inner length extending between an upper upstream end and a lower downstream end. The inner surface defines a hollow interior. The boiler has a pre-combustion zone, a combustion zone downstream from the pre-combustion zone, and a post-combustion zone downstream from the combustion zone. The shell is tapered outward along its length in at least a portion of the combustion zone. An oxidizer inlet is in fluid communication with the pre-combustion zone. A fuel nozzle introduces fuel into the combustion zone. A tube assembly is mounted in the hollow interior of the shell for transferring heat to fluid flowing through the tube assembly. A flue duct is in fluid communication with the post-combustion zone for transporting flue gases from the hollow interior.

In still yet another aspect, a method of burning carbon containing fuel generally comprises introducing an oxidizer into a pre-combustion zone of a boiler, and introducing carbon-containing fuel into a combustion zone of the boiler. The boiler has a shell that is tapered along its length in at least a portion of the combustion zone. The oxidizer and carbon-containing fuel is burned in the combustion zone. Flue gas is removed from a post-combustion zone of the boiler.

In a further aspect, a system for staged, pressurized oxy-combustion generally comprises a plurality of boilers. Each of the boilers includes a shell surrounding a vertical centerline. The shell defines an inner surface having an inner diameter and an inner length extending between an upper upstream end and a lower downstream end. The inner surface defines a hollow interior. The boiler has a pre-combustion zone, a combustion zone downstream from the pre-combustion zone, and a post-combustion zone downstream from the combustion zone. The shell is tapered outward along its length in at least a portion of the combustion zone. An oxidizer inlet is in fluid communication with the pre-combustion zone. A fuel nozzle introduces fuel into the combustion zone. A tube assembly is mounted in the hollow interior of the shell for transferring heat to fluid flowing through the tube assembly, and a flue duct is in fluid communication with the post-combustion zone for transporting flue gases from the hollow interior. An oxidizer source is in fluid communication with the oxidizer inlet of the shell of at least one of the boilers. A fuel source supplies fuel to the fuel nozzle of the shell of each of the boilers. A flue gas source is in fluid communication with the flue duct of the shell of each of the boilers. Carbon dioxide produced by combustion of the fuel within each of the shells is captured.

In yet another aspect, a system for staged, pressurized oxy-combustion generally comprises a plurality of boilers connected in series. Each of the boilers includes a shell surrounding a vertical centerline. The shell defines an inner surface having an inner diameter and an inner length extending between an upper upstream end and a lower downstream end. The inner surface defines a hollow interior. The boiler has a pre-combustion zone, a combustion zone downstream from the pre-combustion zone, and a post-combustion zone downstream from the combustion zone. The shell is tapered outward along its length in at least a portion of the combustion zone. An oxidizer inlet is in fluid communication with the pre-combustion zone. A fuel nozzle introduces fuel into the combustion zone. A tube assembly is mounted in the hollow interior of the shell for transferring heat to fluid flowing through the tube assembly, and a flue duct is in fluid communication with the post-combustion zone for transporting flue gases from the hollow interior. An oxidizer source is in fluid communication with the oxidizer inlet of the shell of at least one of the boilers. A fuel source supplies fuel to the fuel nozzle of the shell of each of the boilers. A flue gas source is in fluid communication with the flue duct of the shell of each of the boilers.

Other aspects of the present invention will be apparent in view of the following description and claims.

BRIEF DESCRIPTION OF THE DRAWINGS

FIG. 13 shows particle impaction and deposition rate based on capture criterion for Stages 1-4.

Corresponding reference characters indicate corresponding parts throughout the drawings.

DETAILED DESCRIPTION OF THE DRAWINGS

Figure 1:
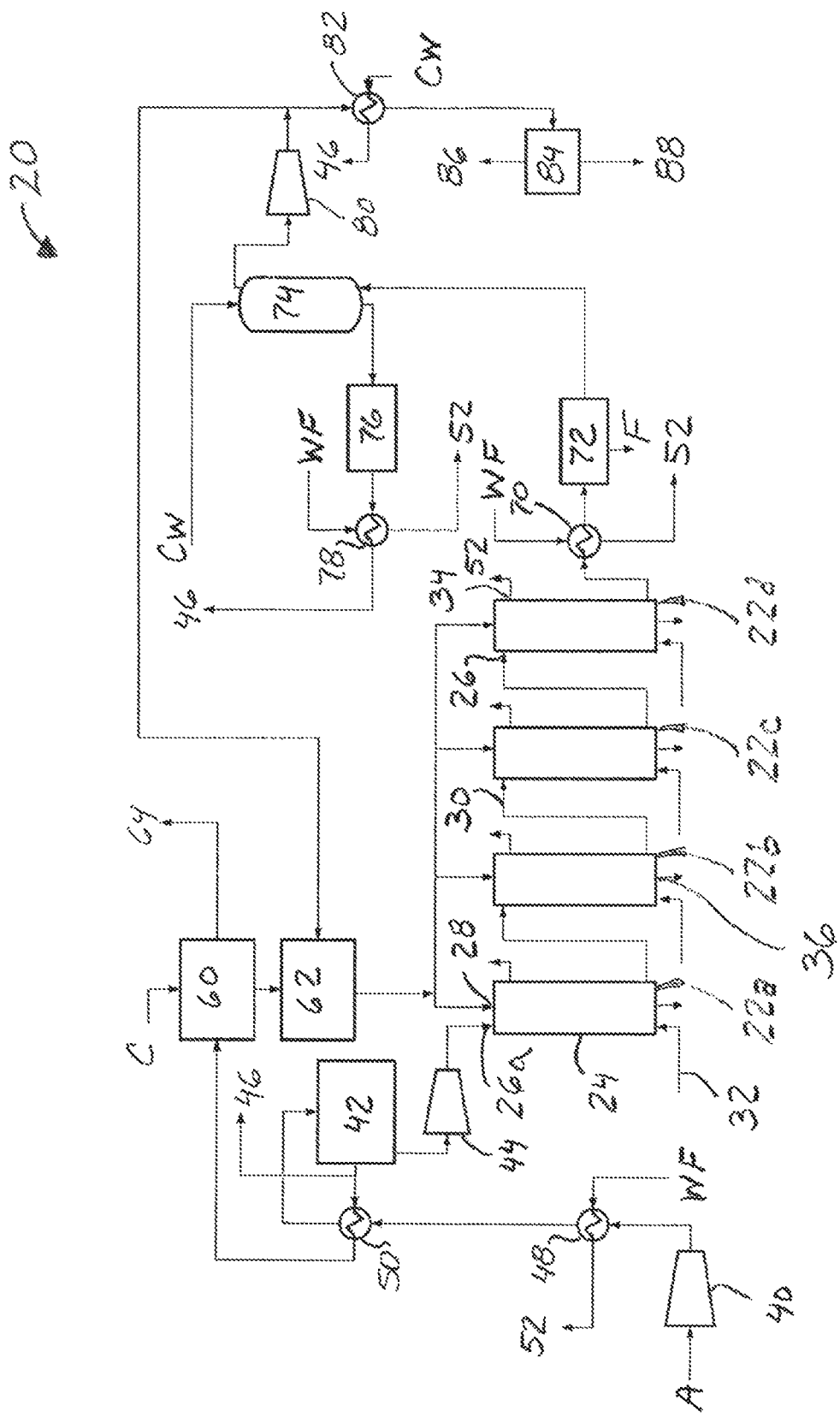
FIG. 1 is a schematic of a system for heating working fluid of one embodiment.

Referring to FIG. 1, a boiler system, more broadly a working fluid heater system, incorporating one embodiment of the present invention is designated in its entirety by the reference number 20. The system 20 includes a plurality of boilers, generally designated 22. In the illustrated system 20, four boilers 22a-d are used. (System components are identified generally by number, and by number followed by an alphabetic character corresponding to its position in series when identified specifically.) Each boiler 22 includes a shell 24 having an oxidizer inlet 26 through which pressurized oxidizer enters the boiler and a fuel inlet 28 through which fuel enters the boiler. The mixture of oxidizer and fuel is burned in the boiler. A flue duct 30 connected to each boiler 22 allows discharge of flue gas resulting from combustion. Each boiler 22 also includes a working fluid inlet 32 and a working fluid outlet 34. Working fluid is discharged from the outlet 32 at a higher temperature than when entering the boiler 22 through the inlet 30. Working fluid enters each boiler 22 through its respective working fluid inlet 32 and exits each boiler 22 through its outlet 34 where it is directed to the steam cycle. Further, each boiler 22 has an ash discharge 36 through which bottom ash is removed from the boiler. The boilers 22 are joined in series so that flue gas from the immediately upstream boiler enters the oxidizer inlet 26 of each boiler downstream from the first boiler. Thus, oxygen (O$_2$) is used as a principle component of an oxidizer in the first boiler 22a in the series, but flue gas from the immediately upstream boiler is used as the oxidizer in each subsequent boiler 22b-d. For example, flue gas from boiler 22b is directed to the oxidizer inlet 26c of boiler 22c. Although all the oxygen is delivered to the first boiler 22a in the described embodiment, some oxygen may be needed in the other boilers for flame stabilization. In general, each boiler may have multiple inlet ports to allow the injection of other gases, for example recycled flue gas to control temperature or heat transfer rate.

Although other technology may be used, in one embodiment air A is directed to an air separation unit having a main air compressor 40 and a cold distillation box 42, which separates oxygen from other air components. In the described embodiment, nearly pure oxygen exiting the separation unit 42 is directed through a second compressor 44 before being directed to the oxidizer inlet 26a of the first boiler 22a. In another embodiment, an alternative air separation unit incorporating pumped liquid oxygen may be used, in which case oxygen leaving the cold distillation box 42 is pressurized and a second compressor 44 is not required. In the first described embodiment, residual air components (i.e., mostly nitrogen (N$_2$)) exit the separation unit 42 and are directed to a conventional cooling tower 46.

Heat exchangers or economizers 48, 50 are provided between the main air compressor 40 and the air separation unit 42. Boiler feed water, more broadly working fluid, WF passes through the first heat exchanger 48 where is heated by the compressed air for use in the steam cycle 52. Some of the residual air components are directed through the second heat exchange 50 for use in coal milling. Other technologies for producing O$_2$, such as membrane air separation, may also be used without departing from the scope of the present invention. As will be appreciated by those skilled in the art, using nearly pure O$_2$ in the boilers 22 and eliminating N$_2$ and other residual air components, the flue gas is primarily CO$_2$ after the O$_2$ is burned in the last boiler 22d and residual water and remaining contaminants are removed.

Coal C, more broadly fuel, enters a coal milling unit 60 where it is pulverized to a predetermined size for use in the boilers 22a-d. In the described embodiment, the residual air components directed to the coal milling unit 60 from the air separation unit 42 are used by the milling unit as will be understood by those skilled in the art. Coal exiting the milling unit 60 is directed to coal feeding unit 62 which feeds a predetermined amount of milled coal to each fuel inlet 28a-d of the boilers 22a-d. The air components used by the milling unit 60 are exhausted through a vent 64. Although other flow rates of milled coal C may be delivered to the boilers 22 without departing from the scope of the present invention, in one embodiment, about 17.4 kg/s of milled coal is delivered through the fuel nozzle 106 of the first boiler 22a and about 20.52 kg/s of milled coal is delivered through the fuel nozzles of each subsequent boiler 22b-22d in the series. Although fuel may be delivered to the boilers using other means, in one embodiment, the feeding unit 62 is a pneumatic dry feeder using a small amount of recycled flue gas as motive gas. Other feeding techniques, such as a dry solids pump, which are capable of delivering dry coal at up to 40 bar without motive gas and slurry feed may also be used without departing from the scope of the present invention.

Flue gas discharged from the final boiler in the series 22d, is directed to a heat exchanger 70 where it is cooled using boiler feed water WF. Although other types of heat exchangers may be used, in one embodiment the heat exchanger 70 is a convective heat exchanger. The resulting heated boiler feed water WF is directed to the steam cycle, and the cooled flue gas is directed to a particulate filter 72 and then to a direct contact cooler or condenser 74 where the flue gas is scrubbed to remove sulfur oxides (SO$_x$) and other contaminants. The temperature of the flue gas exiting the heat exchanger 70 may be selected to prevent acid condensation downstream. The particulate filter 72 (e.g., a candle filter) separates fly ash F from the flue gas. Both cooling and moisture condensation occur in the direct contact cooler 74. Cooling water flows through the cooler 74 from the top, and flue gas from the bottom. The cooler performs a dual role. The first is to cool and condense the moisture from the flue gas, which occurs in the bottom stages. The second is to remove SO$_x$ and NO$_x$, via conversion to dilute sulfuric and nitric acid, which is performed in the top stages. The system 20 is expected to remove almost all of the SO$_2$ and NO$_x$ as the boilers 22 can produce higher NO$_x$ than in a conventional oxy-combustion system (due to the high local flame temperatures) and hence has a lower SO$_x$/NO$_x$ ratio, which is believed to provide higher efficiency SO$_x$ and NO$_x$ removal. Mercury present in the flue gas can also be removed in the same cooler 74 either via dissolution or reaction. Although multiple columns may be used without departing from the scope of the present invention, in one embodiment the cooler 74 is formed as a single column to minimize equipment exposed to corroding acids. Further, the flow rates of the liquid in the column and the column height may be adjusted to allow the top stages of the cooler 74 to be at low temperature, promoting the overall rate-limiting reaction, while allowing most of the cooling and condensation to occur in the bottom stages. Among the advantages of this cooler 74 over others are: 1) the capture of $SO_x$ and $NO_x$ simultaneously, which is more economical as compared to separate removal process such as selective catalytic reduction (SCR) for $NO_x$ removal and sorbent injection for $SO_2$; 2) large pieces of equipment are eliminated, resulting in significant capital cost savings; and 3) acid gas condensation is controlled to occur only in one column, eliminating the chances of corrosion in other parts of the system.

The contaminants scrubbed from the flue gas by the cooler 74 are directed to a neutralizer 76, which uses caustic or other neutralizing agents to adjust acidity of the contaminants, before being directed to a heat exchanger 78 for further cooling. The cooling water used in the direct contact cooler 74 for cooling and condensation exits the bottom of the cooler at relatively high temperature (e.g., about 165° C.) with some acid concentration (e.g., about 730-4000 ppmv. After neutralization, the water is passed through a heat exchanger (e.g., an indirect heat exchanger) for regeneration of low temperature fluid. This heat, in conjunction with the low-grade heat that is available from the air separation unit 42, greatly reduces or eliminates (depending on the fuel) the need for steam extraction from a low pressure turbine in the steam cycle, allowing for higher gross power generation.

The cooled contaminants are directed to the cooling tower 46. Boiler feed water WF passing through the heat exchanger is heated and directed to the steam cycle. The direct contact cooler 74 is connected to cooling water CW for condensing the flue gas. The treated flue gas is directed through a compressor 80 before being recycled through the coal feeding unit 62 and onward to the fuel inlets 28 of the boilers 22. Some of the flue gas passes through a heat exchanger 82 where it is cooled with cooling water CW. The cooling water CW is discharged to the cooling tower 46, and the cooled flue gas is directed to a compression and purification unit 84. Purified fluid gas exhausts through a vent 86 in the purification unit 84, and contaminant residues are directed to sequestration area 88. Although the unit 84 may be selected to operate at other pressures, in one embodiment the unit 84 operates at a pressure of about 35 bar. A small fraction (e.g., about 3-5 vol %) of this compressed, dry flue gas is recycled back for carrying the coal in a dense phase. The majority (e.g., >95 vol %) is sent to the unit after passing through molecular sieves (not shown) for further moisture removal, and a bed of an activated carbon (not shown) for removal of residual mercury in the gas. The purification unit 84 in one embodiment uses cryogenic distillation to purify the $CO_2$ to the desired specification. In one embodiment, an auto-refrigeration unit 84 is used.

Only a small fraction of the flue gas is recycled through the boilers 22. In general, eliminating flue gas recycle results in a dramatic increase in temperature of the combustion products and the rate of radiant heat transfer, as compared to combustion in air. In some instances, the resulting temperatures and heat transfer can damage boiler tubes. As will be appreciated by those skilled in the art, these damaging temperatures and heat transfer rates are avoided by using a plurality of boilers in series, staging fuel delivery, and controlling mixing of fuel and oxidizer in the boilers.

In a conventional boiler, slightly more (e.g., about 15%) oxygen is supplied than required to completely burn the fuel. In the multi-boiler system described above, the first boiler 22a in the series is over-supplied with oxygen to achieve a stoichiometric ratio (i.e., the ratio of $O_2$ supplied to $O_2$ needed for complete combustion) of about 4. The excess $O_2$ acts as a diluent that reduces the temperature of the combustion products and heat transfer. Heat is extracted from the first boiler 22a and is transferred to the steam cycle where the flue gas temperature is reduced. The products of combustion from the first boiler 22a, including the excess $O_2$, are directed to the second boiler 22b where additional fuel is injected and more $O_2$ is consumed. This process continues in the third and fourth boilers 22c, 22d until nearly all of the $O_2$ is consumed. Rather than supplying all the fuel to one boiler, part of the fuel is supplied to each boiler in the series. The total gas flow rate in this process is equivalent to a boiler in which only enough oxygen to burn the fuel is used. When multiple boilers in series are used, dilution is available in a local sense in each boiler to control temperatures and heat transfer. As a result, the amount of heat transfer may be increased while maintaining the temperatures at acceptable levels.

Figure 2:
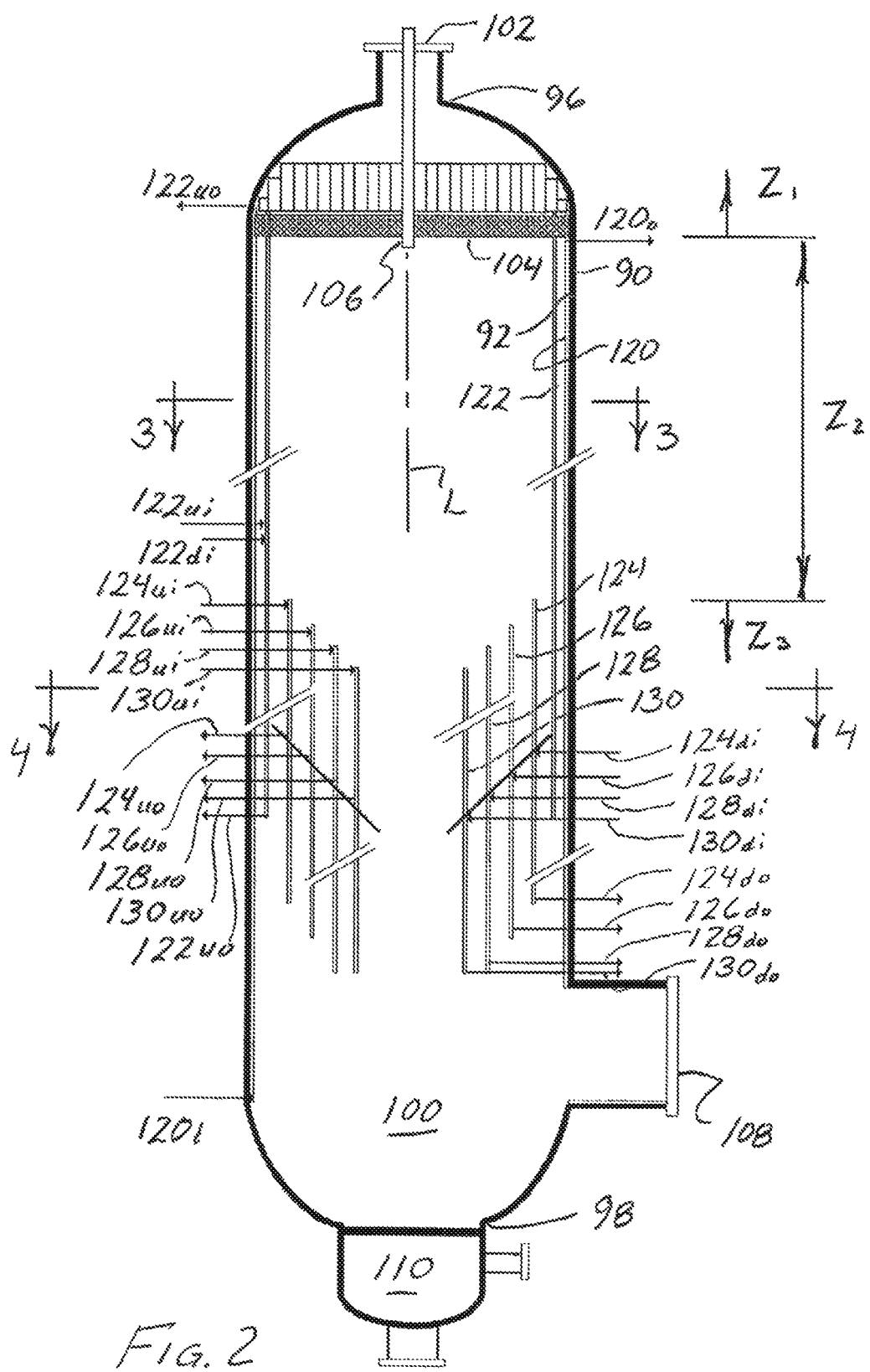
FIG. 2 is a schematic of a vertical cross section of a working fluid heater of one embodiment.

As illustrated in FIG. 2, a boiler, more broadly a working fluid heater, incorporating a first embodiment of the present invention is designated in its entirety by the reference number 22. This boiler is representative of the plurality of boilers 22 joined in series in FIG. 1. As further shown in FIG. 2, the boiler 22 includes an elongate cylindrical shell 90 surrounding a vertical centerline L. The shell 90 has an inner surface 92 having an inner diameter and an inner length extending between an upper upstream end 96 and a lower downstream end 98. Although the inner diameter and length of the shell may vary without departing from the scope of the present invention, in one embodiment, the shell has an inner diameter of about 13 ft to about 15 ft and a length of about 240 ft. Further, in one embodiment, the diameter tapers from about 15 ft at the upper end 96 to about 13 feet at the lower end 98. The inner surface 92 of the shell 90 defines a hollow interior 100 having a pre-combustion zone $Z_1$, a combustion zone $Z_2$ downstream from the precombustion zone, and a post-combustion zone $Z_3$ downstream from the combustion zone. The shell 90 forms a pressure vessel capable of withstanding anticipated pressures achieved in the process. An oxidizer inlet 102 enters the pre-combustion zone $Z_1$ of the hollow interior 100 adjacent the upstream end 96 of the shell 90. A flow distributor 104 is mounted in the hollow interior 100 of the shell 90 downstream from the oxidizer inlet 102. The flow distributor 104 is selected to provide a sufficiently high pressure drop that oxidizer downstream from the distributor has an even radial flow distribution, an even circumferential flow distribution, and a ratio of circular momentum to axial momentum of less than about 0.2. The shell 90 also has a fuel nozzle 106 positioned adjacent the upstream end 96 for introducing fuel into the combustion zone $Z_2$ of the hollow interior 100 of the shell along the centerline L and downstream from the flow distributor 104. The fuel injected into the interior 100 through the nozzle 106 along the center axis and the low mixing between the oxidizer and fuel creates a long combustion zone $Z_2$ and a thin flame, which reduces heat transfer rates at the shell 90. An outlet 108 leading to a flue duct 30 (FIG. 1) is provided in the side of the shell 90 adjacent the downstream end 98 for transporting flue gas from the hollow interior 100. An ash and condensate trap 110 is provided at the bottom of the boiler 22 for collecting bottom ash and water.

Figure 3:
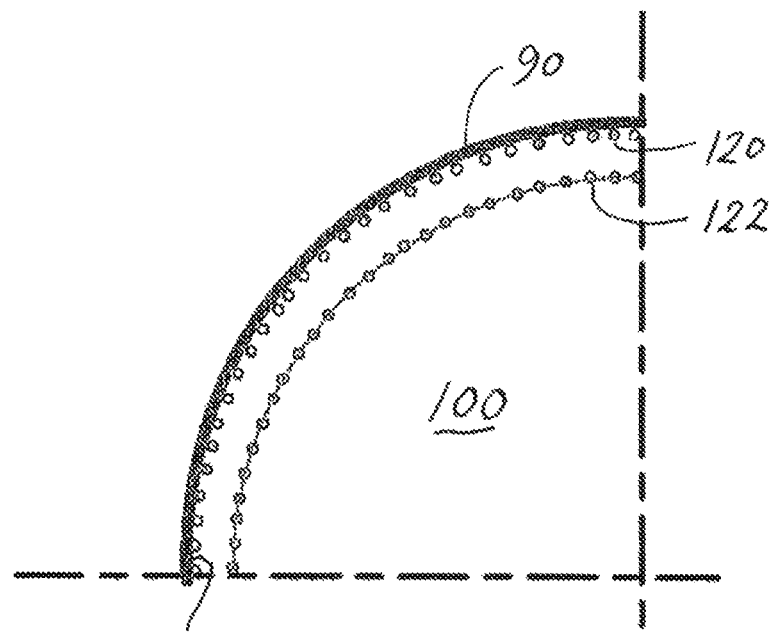
FIG. 3 is a partial cross section taken in the plane of line 3-3 of FIG. 2.
Figure 4:
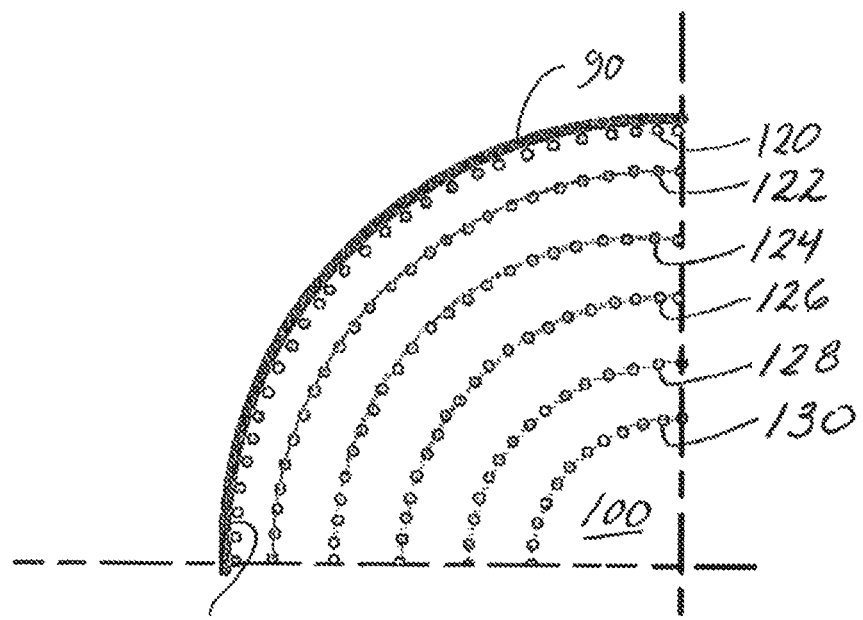
FIG. 4 is a partial cross section taken in the plane of line 4-4 of FIG. 2.

As illustrated in FIGS. 2-4, the boiler 22 has several tube assemblies 120-130 comprising tubes extending axially with respect to the centerline L. The tube assemblies 120-130 are mounted in the combustion zone $Z_2$ and post-combustion zone $Z_3$ of the hollow interior 100 of the shell 90 for transferring heat primarily by radiation heat transfer from combusting fuel adjacent the centerline L to working fluid flowing through the assemblies. Tube assemblies 120 and 122 extend from the flow distributor 104, through the combustion zone $Z_2$ to absorb radiant heat provided by flame in the combustion zone and shield the shell 90 from the flame. These tube assemblies 120, 122 extend into the post-combustion zone $Z_3$, to supplement heat transfer provided by tubes 124-130, which extend through the post-combustion zone $Z_3$. In order to prevent the tubes in tube assemblies 120 and 122 from overheating, they are positioned at larger diameters than the other tube assemblies 124-130. For example, in one embodiment tube assembly 120 is positioned at a diameter of about 14.9 ft, tube assembly 122 is positioned at about 13 ft, tube assembly 124 is positioned at about 10.6 ft, tube assembly 126 is positioned at about 8.2 ft, tube assembly 128 is positioned about 5.6 ft, and tube assembly 130 is positioned at about 3 ft. Further, the tubes 120-130 are positioned in the shell 90 with their upstream ends at different axial locations with respect to the flow distributor 104. For example, in the aforementioned embodiment tube assemblies 120 and 122 have upstream ends that are positioned upstream from the flow distributor 104, the upstream end of tube assembly 124 is positioned at about 175 ft downstream from the flow distributor, tube assembly 126 is positioned at about 185 ft, tube assembly 128 is positioned about 195 ft, and tube assembly 130 is positioned at about 205 ft. The tube assemblies 120-130 also have different lengths. In the same embodiment, tube assembly 120 is about 237 ft long, assembly 122 is about 198 ft, assembly 124 is about 23 ft, tube assembly 126 is about 41 ft, tube assembly 128 is about 55 ft, and tube assembly 130 is about 62 ft.

Tube assembly 120 has an inlet $120_i$ at its downstream end and an outlet $120_o$ at its upstream end. Cooling water CW is transported the tube assembly 120 to form a tube liner that shields the shell 90 from heat generated by the burning fuel. In one embodiment, the cooling water CW remains at a temperature below about 294° C. at the outlet $120_o$ to prevent damage to the shell 90. Each assembly 122-130 is divided into an upstream or superheater portion $122_u$-$130_u$, respectively, and a downstream or reheater portion $122_d$-$130_d$, respectively. Each upstream portion $122_u$-$130_u$ forms a superheater unit having an inlet $122_{ui}$-$130_{ui}$, respectively, at its downstream end and an outlet $122_{uo}$-$130_{uo}$, respectively, at its upstream end. Each downstream portion $122_d$-$130_d$, forms a reheater unit having an inlet $122_{di}$-$130_{di}$, respectively, at its upstream end and an outlet $122_{do}$-$130_{do}$, respectively, at its downstream end. As will be appreciated by those skilled in the art, the positions of the various tube assembly inlets $120_i$-$122_{ui}$-$130_{ui}$, $122_{di}$-$130_{di}$ and outlets $120_o$, $122_{uo}$-$130_{uo}$, $122_{do}$-$130_{do}$ are selected so the assemblies 120-130 provide working fluid of a selected temperature. For example, in the previously mentioned embodiment, the fluid entering tube assembly inlet $122_{ui}$ is about 294 ° C. and is heated so it exits the upper portion tube assembly outlet $122_{uo}$ at about 384 ° C. Fluid entering the remaining upstream portions of the tube assembly inlets $124_{ui}$-$130_{ui}$ at about 384 ° C. and is heated so it exits the corresponding tube assembly outlets $124_{uo}$-$130_{uo}$ at about 593° C. Similarly, fluid entering tube assembly inlet $122_{di}$ is about 384° C. and is heated so it exits the upstream portion tube assembly outlet $122_{do}$ at about 593° C. Fluid entering the remaining downstream portions of the tube assembly inlets $124_{di}$-$130_{di}$ at about 352° C. and is heated so it exits the corresponding tube assembly outlets $124_{do}$-$130_{do}$ at about 593° C. The various fluid temperatures are selected to provide working fluid at advantageous temperatures for use in other parts of the system as explained below.

Figure 5:
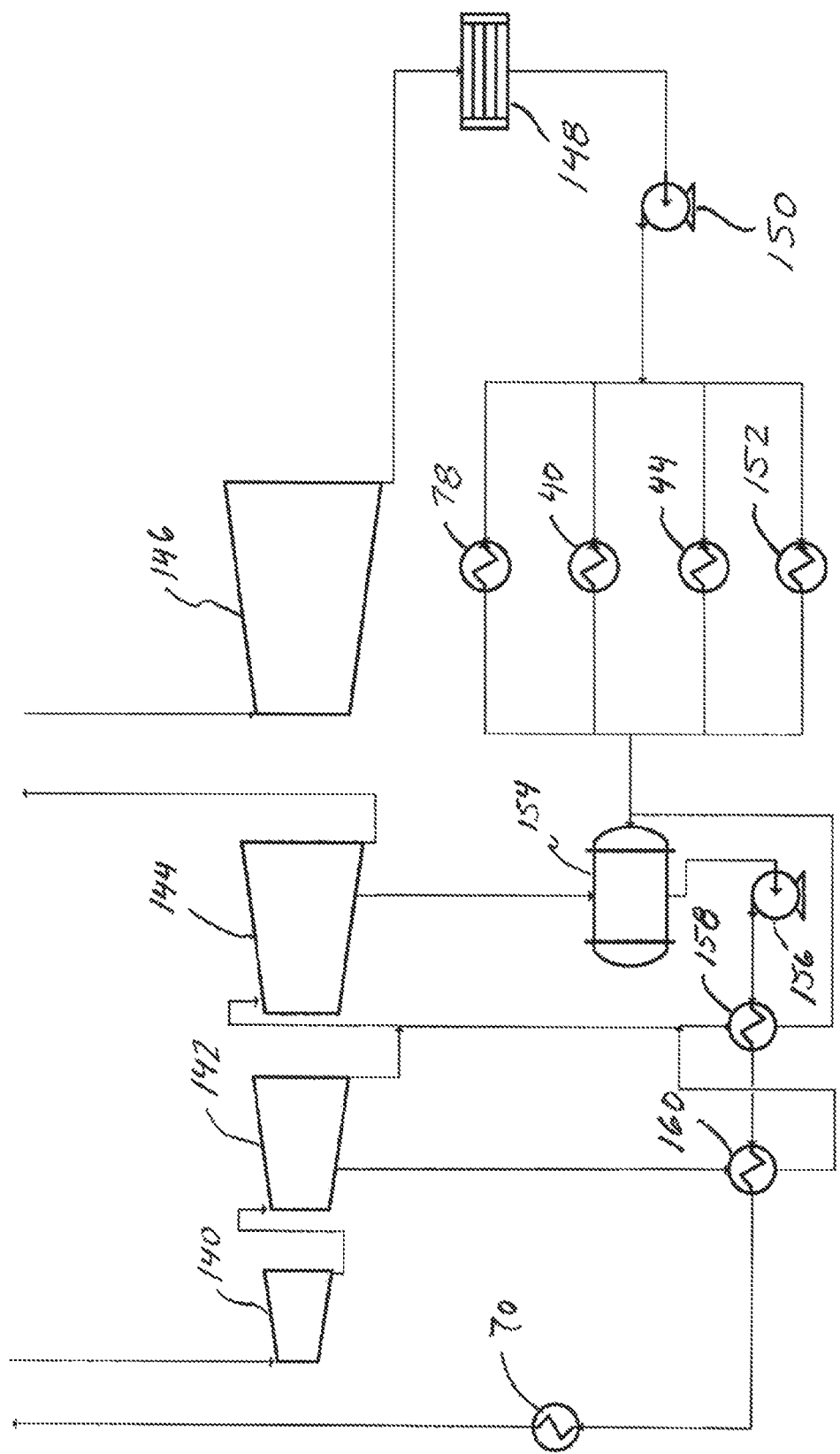
FIG. 5 is a schematic of a working fluid cycle of one embodiment.

As shown in FIG. 5, the steam cycle 58 includes one or more turbines having a governing stage 140, a high pressure stage 142, an intermediate pressure stage 144, and a low pressure stage. Working fluid is directed from the outlets of the upstream portions of tube assemblies $122_{ua}$-$130_{uo}$ to the governing stage 140 and onward to the high pressure stage 142. The high pressure stage 142 feeds steam to the intermediate stage 144. Steam exiting the intermediate stage 144 is directed to the inlets of the downstream portions of tube assemblies $122_{di}$-$130_{di}$ for reheating before returning to the low pressure stage 146. After exiting the low pressure stage 146 of the turbine, the working fluid is directed to a condenser 148. Although other condensers may be used, in one embodiment, the condenser 148 is selected to have a pressure of 0.048 bar and a terminal temperature difference of 11.7° C. A pump 150 is provided for pumping fluid from the condenser 148. The fluid is pumped to the heat exchanger 78 and used as the cooling water CW for condensing the flue gas with the heat exchanger 82 as previously explained. The fluid is also pumped to intercoolers in the main air compressor 40, the oxygen air compressor 44, and a booster air compressor 152.

As further illustrated in FIG. 5, working fluid is bled from the intermediate stage 144. This fluid passes through a deaerator 154 to remove oxygen and other dissolved gases from the fluid. Used cooling fluid from the heat exchanger 78, and the intercoolers in the main air compressor 40, the oxygen air compressor 44, and the booster air compressor 152 are also fed through the deaerator 154. A pump 156 is provided for pumping fluid from the deaerator 154 through heat exchangers 156, 160, 70, sequentially, and on to the inlets of the upstream tube assemblies $122_{ui}$-$130_{ui}$. Fluid in these tube assemblies is heated and returned from the outlets of the upstream portions of tube assemblies $122_{uo}$-$130_{uo}$ to the governing stage 140. Fluid bled from the high pressure stage 142 is directed through heat exchangers 158, 160 to heat the fluid before reaching the heat exchanger 70. The bleed fluid passing through heat exchanger 160 is mixed with bleed fluid entering heat exchanger 158, and the bleed fluid exiting the heat exchanger 158 is directed to the deaerator 154 where it mixes with the other fluid entering the deaerator. As will be apparent to those skilled in the art, heat generated from the compression of air is integrated with the steam cycle and used for boiler feed water regeneration.

The system 20 described above is used to heat working fluid by burning carbon-containing fuel in pressurized boilers or working fluid heaters 22. An oxidizer (e.g., $O_2$, or $O_2$ and flue gas) and carbon-containing fuel is introduced to an upstream boiler (e.g., 22a or 22b) The oxidizer and carbon-containing fuel is burned in the upstream boiler, and the flue gas emitted from the upstream boiler is transported to a downstream boiler (e.g., 22b or 22c). The flue gas is introduced to the downstream boiler for use as an oxidizer. Carbon-containing fuel is introduced to the downstream boiler, and the flue gas and carbon-containing fuel are burned in the downstream boiler. The oxidizer is introduced into the respective boiler through a flow distributor 104 so the oxidizer enters the boiler with circumferentially and axially even distributions. The distributor 104 further ensures the oxidizer has a ratio of circular momentum to axial momentum of less than about 0.2. Heat exchangers 122-130 are provided in each boiler 22 to heat working fluid by passing it through the heat exchanger when burning the oxidizer and carbon-containing fuel. In some embodiments, heat exchangers 124-130 are divided so they provide a superheater unit and a reheater unit.

The system uses an air separation unit 42 for separating oxygen from air. The separated oxygen is delivered to the upstream boiler (e.g., boiler 22a) for use as the oxidizer. Although other flow rates of oxygen may be delivered without departing from the scope of the present invention, in one embodiment about 120 kg/s of oxygen are delivered through the oxidizer inlet 102 into the hollow interior 100 of the shell 90 of the first boiler 22a in the series. After the flue gas is emitted from the final boiler, it is filtered to separate fly ash from the flue gas. The filtered flue gas is scrubbed by the direct contact cooler 74 to remove sulphur oxides and nitrogen oxides. The cooler 74 also cools the flue gas.

The portion of the system shown in FIG. 5 expands working fluid emitted by each boiler 22 with a multi-stage turbine. Working fluid from the superheater unit is delivered to the highest pressure stage (e.g., governing stage 140). Working fluid emitted from an intermediate stage (e.g., stage 144) is delivered to the reheater unit. Once heated by the reheater unit, the working fluid is delivered to a lower pressure stage (e.g., stage 146) where the fluid is expanded. Fluid leaving the lowest pressure stage (e.g., stage 146) is delivered to one or more heat exchangers where it is heated and returned to the boilers 22 for heating.

Several variables should be considered when selecting the boiler operating pressures. First, flue gas moisture condensation as a function of pressure and temperature should be considered. Second, the pressure needed for effective removal of $SO_2$ and $NO_x$. Third, in order to transfer most of the heat extracted at the direct contact cooler 76 to the cold boiler feed water for regeneration while maintaining the minimum approach temperature in the regenerator, the pressure should be high enough to transfer the heat to the boiler feed water without violating the minimum temperature approach. Fourth, fluid mechanics should also be considered. As these considerations are well within the skill of the ordinary artisan, they will not be discussed in detail.

The process described above uses combustion of carbon-based fuels (e.g., coal) for supplying high temperature and pressure working fluid (e.g., steam) for generating power. Carbon dioxide ($CO_2$) produced during the process is captured and prevented from being emitted to the atmosphere.

For more information concerning the system and process described above, reference may be made to Axelbaum, et al., "Process Design and Performance Analysis of a Staged, Pressurized Oxy-Combustion (SPOC) Power Plant for Carbon Capture", Applied Energy, volume 125, (Jul. 15, 2014), and Axelbaum, et al., "Phase I Topical Report: Staged, High-Pressure Oxy-Combustion Technology: Development and Scale-Up", DOE Award Number DE-FE0009702 (issued Jun. 28, 2013), both of which are hereby incorporated by reference.

The system 20 and process described above provide several advantages. Fuel staging allows a large degree of control over radiative heat transfer in the boiler. By controlling the mixing and the local ratios of fuel and oxygen, the combustion temperature and radiation can be manipulated. Furthermore, by introducing the fuel in stages, the overall length of the radiative section can be lengthened, allowing more heat to be transferred by radiation, as opposed to convection. Because the rate of heat transfer is higher for radiation than convection, staged combustion minimizes the required boiler tube surface area, reducing capital costs. In addition, fuel staging allows increased control over radiative heat transfer in the boiler. By controlling the mixing and the local ratios of fuel and oxygen, the combustion temperature and radiation can be manipulated. Furthermore, by introducing the fuel in stages, the overall length of the radiative section can be increased.

The system 20 and process described above produces high local temperature but controlled heat transfer rates, potentially leading to higher levels of $NO_x$ and thus a more effective process for combined $SO_x$ and $NO_x$ removal. This increases efficiency and significantly reduces capital costs over scrubbing approaches for $SO_x$ removal.

Eliminating flue gas recycle potentially reduces the size of the boilers, pumps, and other equipment. Heat loss to the ambient is also reduced. Importantly, the volume of gas undergoing treatment for removal of ash and other contaminants is reduced, and the concentrations of these contaminants is increased, making their removal easier and more cost effective. Further, flue gas recirculation accounts for a significant amount of parasitic power demand (about 3.5-5% of the plant electrical output) in conventional pressurized oxy-fuel systems. By eliminating recycled flue gas, losses associated with recycle and the equipment for transporting the recycled gas are avoided. Thus, efficiencies are higher and capital costs are lower.

Some low rank fuels, such as lignite, have limited use due to their very high moisture content, making them difficult to ignite or combust in air because moisture evaporation lowers flame temperature and delays volatile release. Using pure oxygen results in a higher flame temperature near the burner and improved stability, making low rank fuels easier to burn. Further, since much of the latent heat in the flue gas can be captured in pressurized combustion, the effective heating value of "low-Btu" fuels can be significantly increased.

In brief, the primary benefits of pressurized oxy-combustion include: 1) the moisture in the flue gas condenses at higher temperature, and thus the latent heat of condensation can be utilized to improve the overall cycle efficiency; 2) the gas volume is greatly reduced, therefore the size and cost of equipment can be reduced; 3) air ingress, which normally occurs in induced-draft systems, is avoided, thereby increasing the $CO_2$ concentration of the combustion products and reducing purification costs; and 4) at higher pressure, the convective heat transfer to boiler tubes is increased, for a given mean velocity. This is due to the increase in flue gas density with pressure, and therefore increased Reynolds number and convective heat transfer coefficient.

Computational Fluid Dynamics (CFD) was used to model the above-described process (i.e., staged, pressurized oxy-combustion or "SPOC") and determine the effects of operating conditions on the radiative and convective heat transfer in the boilers. Moreover, ash deposition was simulated to address potential concerns associate with slagging and fouling. As described in more detail below, the results suggested that the proposed SPOC radiant boiler design can control heat flux and particle deposition, and that the process holds promise to reduce cost of carbon capture from power plants.

A brief summary of the process used in the model, which involves the combustion of pulverized coal with minimal recycle by staging the fuel delivery, is given below.

The fact that the $CO_2$ captured must ultimately be pressurized for geo-sequestration or Enhanced Oil Recovery (EOR) enables pressurized oxy-combustion to be implemented at no net pumping cost because the energy to pump oxygen is comparable to that to pump $CO_2$. Earlier studies have indicated that overall plant efficiency can be improved by as much as 3 percentage points by pressurizing the oxy-coal combustion process. As mentioned earlier, the primary benefits of pressurized oxy-combustion are: (1)

recovering latent heat from flue gas moisture; (2) reducing the size and cost of equipment; (3) avoiding air ingress; and (4) increasing the convective heat transfer for a given mean velocity.

Normally, burning fuel in oxygen without dilution from inert gases, as compared to combustion in air, would lead to a dramatic increase in both the flame temperature and the rate of radiant heat transfer. In the SPOC process, this problem is at least partially circumvented by staging the delivery of fuel so that both combustion products and excess $O_2$ are utilized for dilution. The concept of fuel staging is depicted in FIG. 1. As described above, only a fraction of the total fuel for the plant is supplied in the first stage, but most of the oxygen is supplied, which means there is an oversupply of oxygen. This implies that the stoichiometric ratio is much greater than unity, where the stoichiometric ratio is defined as the ratio of the mass of oxygen supplied to the mass of oxygen required for stoichiometric combustion of the fuel supplied in this particular stage. The large amount of excess $O_2$ effectively acts as a diluent to control the mean temperature of the combustion products and thus moderates the heat transfer. Heat is extracted from the first stage and is transferred to the Rankine steam cycle, which reduces the flue gas temperature. The products of combustion from Stage 1 (i.e., boiler 22a of FIG. 1), including the excess $O_2$, are passed to Stage 2 (i.e., boiler 22b of FIG. 1), where additional fuel is injected and more $O_2$ is consumed. This process continues in subsequent stages until nearly all of the $O_2$ is consumed. It is important to note that the total gas flow rate in the SPOC process is equivalent to the case in which coal and oxygen, in nearly stoichiometric proportion, are combusted in a single stage; i.e., there is no net addition of dilution gases.

The SPOC process can capture carbon dioxide while producing electricity at higher efficiency and lower cost than "first-generation" oxy-combustion approaches. The net efficiency of this process, as determined through ASPEN modeling, is up to 6 percentage points higher than first-generation oxy-combustion technologies for PRB coal. This increase in efficiency is due to the latent heat recovery associated with flue gas moisture condensation at high temperatures, capture and integration of waste heat from the auxiliary systems, and the auxiliary load reduction due to minimal recycle and high pressure. In addition, the bulk of the $SO_x$ and $NO_x$ is removed during the cooling of flue gas in a direct contact column. This conversion of gaseous $SO_x$ and $NO_x$ into weak acids in the column is enabled at elevated pressures. This integrated approach significantly reduces the cost of cleanup.

The goal of developing this model was to optimize the design of a nonconventional pressurized boiler specifically for this SPOC system. It involved computational fluid dynamics (CFD) simulations to model the process in a cylindrical pressure vessel at elevated pressure, and to determine the effects of operating conditions on the radiative and convective heat transfer in the boiler. Specific objectives were (1) understanding the behavior of heat flux on the wall and maximize the uniformity of the heat flux while not exceeding the maximum value for boiler tube materials; and (2) minimize particle deposition on the wall.

ANSYS FLUENT version 13.0 was used for this study. The flow field was modeled applying the Reynolds Averaged Navier Stokes (RANS) equations with the Semi-Implicit Method for Pressure Linked Equations (SIMPLE) algorithm to address pressure-velocity coupling. RANS has been used to study the flame behaviors of pulverized fuel. The sub-models for solid fuels combustion have been extensively validated for scales from laboratory to industrial. It has been shown that RANS is able to provide reasonable agreement between experiments and CFD simulations.

In turbulent combustion simulations, modeling the turbulence is one of the most significant considerations. Serious limitations have been observed for the model in the near-wall region. This model over predicts the turbulence scale for flows with adverse pressure gradients, which leads to higher heat transfer rates and wall shear stress. It is a great advantage to use the $\omega$-equation in the near wall region. However, the solution of the standard model is k-$\omega$ model is strongly sensitive to the free stream values of $\omega$ outside the boundary layer. To address the problems associated with standard k-$\varepsilon$ and standard k-$\omega$ models, the shear stress transport (SST) k-$\omega$ model has been developed to combine the best of the two eddy-viscosity models. The SST k-$\omega$ model was used in this simulation.

The turbulence-chemistry interactions is another significant consideration in turbulent combustion modeling. The Eddy Dissipation Model (EDM) was utilized in this simulation, as it has been successfully used in oxy-coal combustion modeling. In the EDM, the chemical reaction rate is determined by the large-eddy mixing time scale (k/$\varepsilon$). The reaction rate in the EDM is limited by the mixing rate of reactants and the heating rate of reactants via the mixing with the products.

The trajectories of particles was computed in a Lagrangian frame and coupled to the gas phase in the Eulerian frame. With this approach, mass, momentum, and energy are exchanged between the two phases. All discrete particles that were injected into the system were assumed to be spherical. The pulverized coal particle size was assumed to follow the Rosin-Rammler distribution, with an average diameter of 65 μm.

The Chemical Percolation Devolatilization (CPD) model was used to calculate the thermal decomposition rate of the coal particles. NMR chemical structure parameters were calculated according to the correlations in Genetti D, Fletcher T H, Pugmire R J., *Development and application of a correlation of 13C NMR chemical structural analyses of coal based on elemental composition and volatile matter content*, Energy & Fuels. 1998; 13:60-8. Ultimate and proximate analyses were applied to determine the chemical properties of volatile matter. The oxidization of volatile gases was modeled using a two-step reaction mechanism with wet combustion.

The kinetic/diffusion-limited rate model was applied for char surface reactions. This model assumes that the surface reaction rate is limited by the kinetic rate and diffusion rate.

Radiation is the dominant heat transfer mode in the combustion environment at such high temperatures with hot solid particles participating in the radiation heat transfer. Since particle radiation from coal, char, and ash can contribute significantly to radiation heat transfer, its contribution was also considered by including the particle absorption and scattering effects in the radiative transfer equation (RTE). The Discrete Ordinates (DO) radiation model was used in this simulation to solve the RTE, with each octant being discretized into 4×4 solid angles. Gaseous absorption was considered by a domain-based Weighted Sum of Gray Gases model (WSGGM).

In FLUENT, the discrete phase model (DPM) was applied to compute the particle trajectories and to determine the mass and energy transfer to and from the particles, with two-way coupling between the discrete phase and the continuous phase. The effect of turbulence on the particle trajectories was accounted for with the Discrete Random Walk (DRW) model. The particle thermophoretic velocity for SPOC was calculated to be on the magnitude of $10^{-5}$ m/s based on the expression in Friedlander S K., *Smoke, dust, and haze*, Oxford University Press New York; 2000. Therefore, the thermophoretic force was ignored in the CFD simulation.

The 3-D double precision pressure-based solver in FLUENT 13.0 was used for the RANS simulation with the second-order upwind scheme. The RANS simulations were performed on a high performance cluster with 12 compute nodes and 1 head node all running Scientific Linux. There are totally 240 INTEL Xeon E5 compute cores running at 2.5 GHz and 1536 GB ECC DDR3 ram running at 1866 MHz for computations, with QDR Infiniband interconnects running through an 18 port switch. During the simulation, the cold flow field was achieved first, followed by the ignition patch with the injection of coal particle and activation of reactions applying EDM. After the converged solution was obtained, the DO radiation model with particle radiation interaction as well as the second order scheme for the momentum, turbulence, species transport, energy, and radiation equations were applied to obtain the final converged solution.

The need for carbon ($CO_2$) capture, utilization, and storage has dramatically changed the requirements for power generation, and this fact demands a reevaluation of the steam generation process. The SPOC process demonstrates that substantial benefits can be realized with high-pressure combustion and low flue gas recycle. Nonetheless, one major issue with burning coal with limited flue gas recycle lies in how to control the radiative heat flux, due to the extremely high local flame temperatures that can be realized. With SPOC, the gas temperatures for the fully mixed gases are controlled by excess oxygen but the local temperatures can still be much higher than for air-fired systems or for systems with full flue gas recycle.

To address this issue, a burner/boiler has been designed and is described below for a case study of a 550MWe plant. The major design criteria for the SPOC boilers are to 1) optimize radiative wall heat flux, 2) avoid flame impingement, and 3) minimize particle deposition to avoid slagging, fouling, and corrosion.

Figure 6:
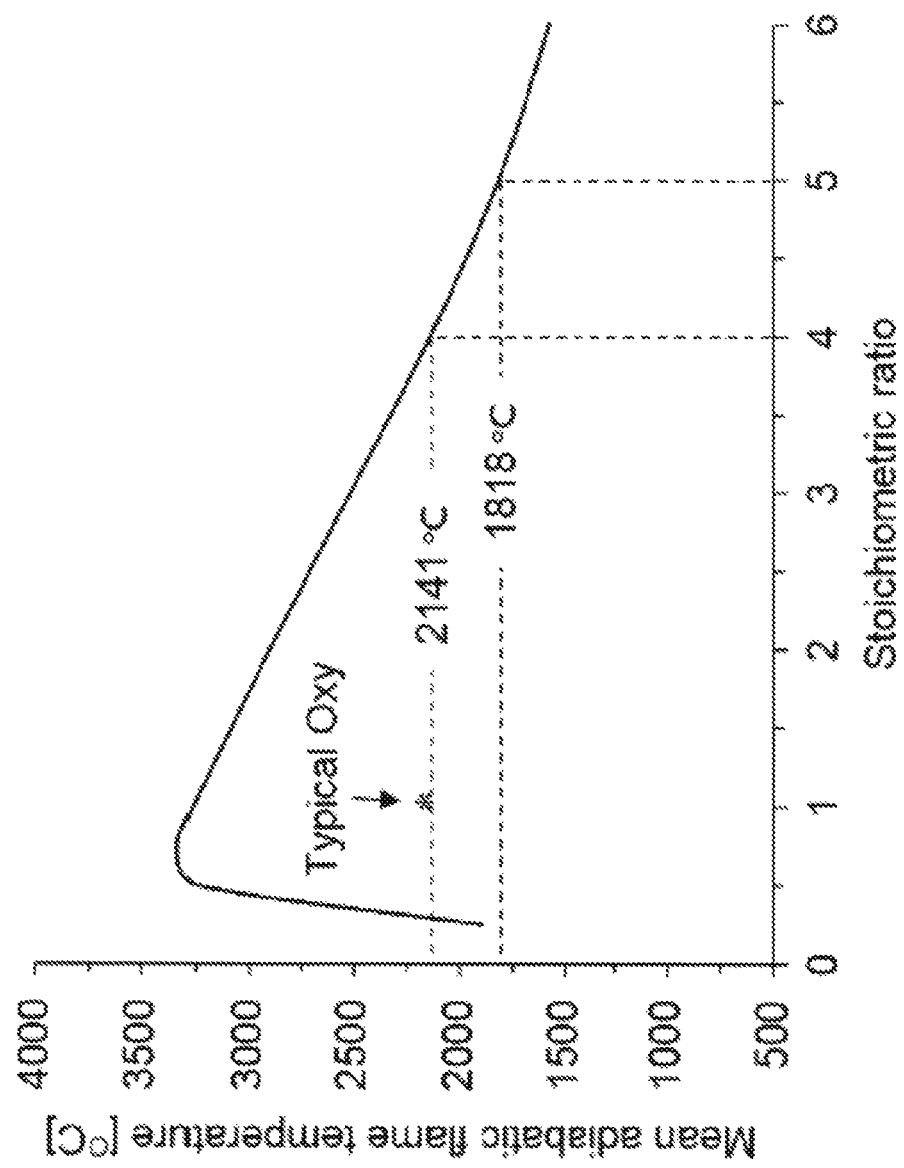
FIG. 6 is a graph depicting the CEA analysis of overall adiabatic flame temperature at different stoichiometric ratios, when coal is combusted in pure oxygen (solid line), and in typical oxy-coal environment (star).

FIG. 6 shows the results of a CEA analysis for the overall adiabatic flame temperature at constant pressure as a function of stoichiometric ratio, when coal is combusted in pure oxygen. For a stoichiometric ratio of 1, the overall adiabatic temperature is approximately 3260 ° C. The temperature is lower at a higher stoichiometric ratio because the excess oxygen acts as a diluent. At a stoichiometric ratio of 4, the overall adiabatic flame temperature is approximately 2141 ° C., which is comparable to that of oxy-coal combustion with $O_2/CO_2$ of 30/70 vol. %, as shown in FIG. 6. Reducing the overall adiabatic flame temperature by operating under high stoichiometric ratio, i.e., excess oxidizer, is also what is done to the control gas temperature in gas turbines. It that case, excess air is used, but the temperature is still controlled because the excess oxidizer acts as a diluent.

By supplying all of the oxygen in the first stage, but only one fourth of the coal, the stoichiometric ratio is 4 for this stage and the overall temperature is manageable. Lower overall adiabatic flame temperatures are possible by, for example, operating Stage 1 at λ=5, but our modeling results show that the heat flux can be controlled to an acceptable level by selecting four stages. Selecting more stages complicates the system, and could have economic consequence. Four stages were therefore selected for the SPOC system, and the basis of selection has been verified by the CFD results below.

The first stage presents a unique challenge because, while the overall temperature is manageable by excess oxidizer, the local temperatures can be quite high.

As this is a pressurized system, the first constraint to the boiler design comes from the intrinsic shape of pressure vessels. They are generally cylindrical in shape with relatively large aspect ratios (length-to-diameter). The cost of fabricating such vessels can rise dramatically if they are fabricated on site and transportation requirements limit the maximum size for pre-fabricated pressure vessels to approximately 61 m (200 ft) in length and 4.6 m (15 ft) in outer diameter. Such a vessel can be transported by rail. For purposes of this study, this size will be considered the maximum size, although this constraint can be relaxed if the economics support on-site fabrication.

For normal boilers, a peak heat flux of approximately 400 $kW/m^2$ is typical. Advanced alloy boiler tube materials can withstand fluxes up to approximately 650 $kW/m^2$. With this constraint we can approximate the total length of pressure vessel needed when there is only one bank of tubes and they are located on the inside walls of the pressure vessels (e.g., membrane wall). For the 4.6 m diameter vessel it is assumed that the membrane wall would be 3.96 m (13 ft) in diameter. For a wall heat flux of 400 $kW/m^2$ and heat transfer requirement of 1300 MWth in the radiant boilers, based on SPOC process simulation, the required boiler tube surface area dictates roughly 244 m (800 ft) length of reactor vessel. Of course, interior tubes can be added to reduce this length but this result suggests that four separate vessels be utilized for the case study. Therefore, for each stage, a separate pressure vessel is employed.

To ensure uniform and high radiative heat flux over the long length of the vessel suggests that distributed heat release, as opposed to concentrated heat release, is desired for the coal combustion and that the heat release should occur over a scale of approximately 30.5 m (100 ft). In high swirl or in flameless combustion the mixing rate is fast. Here mixing rate should be slow in order to distribute the heat release, minimize maximum temperature, and obtain a more uniform radiative heat flux to the walls.

To avoid slagging, the flame must remain away from the walls because of the very high flame temperature, particularly in Stage 1, where the oxygen concentration is highest. From a simple understanding of flame structure, a stoichiometric ratio of unity would require that the flame hit the wall as a consequence of the fuel demand for oxygen. Under conditions of high flame temperature, this would lead to particle deposition and slagging. The high stoichiometric ratio in the first few stages ensures that the flame does not need to reach the walls for complete combustion. As will be shown, the excessive oxygen can also be used to avoid flame impingement and slagging and to control mixing and thus wall heat flux.

In the subsequent stages, the oxygen is diluted by the products of combustion of the previous stages, so control of heat flux is less challenging. Nonetheless, the excess oxidizer in Stages 2 and 3 continue to be important in enabling control of heat flux, flame impingement, and slagging/deposition.

Due to the high flame temperature under SPOC conditions, minimization of ash deposition becomes an important requirement for the design of SPOC reactors. Any radial velocity caused by external recirculation could lead to collisions between high-temperature particles and the wall, increasing the tendency for ash deposition and slagging. Thus, enclosed jet theory was applied to design a combustor that avoids external recirculation in the boiler. To eliminate external recirculation, the Thring-Newby parameter was used to determine conditions leading to the onset of recirculation. The Thring-Newby parameter θ is given by $$\theta' = \frac{d'_0}{d_1}\left(\frac{\rho_0}{\rho_1}\right)^{0.5}\frac{m_0 + m_1}{m_0}, \qquad \text{Equation 1.}$$

Where $m_0$ and $m_1$ refer to the mass flow rates, $\rho_0$ and $\rho_1$ the density, and $d_0$ and $d_1$ the equivalent diameters of the primary (PO) and secondary (SO) oxidizer tubes, respectively. External recirculation can avoided by ensuring that the Thring-Newby parameter is greater than 0.9. This represents a design tool to estimate for appropriate dimensions and flow rates for the burner. The Thring-Newby parameter allows for a design that can 1) slow down mixing to yield a longer flame and thus lower heat release, enabling a lower flame temperature and more uniform wall heat flux; and 2) eliminate external recirculation zone to avoid slagging.

As described previously, the initial design approach to determine the number of stages is to have a mean temperature of each stage similar to that of a conventional system, while at the same time to ensure that the oxygen concentration reaches 2.7 vol. % (dry basis) by the end of the final stage. The combustion gases of each preceding stage are cooled by heat transfer to the boiler tubes prior to entering the next stage. Four stages, with a cooling of the flue gas to 700° C. between each stage, were determined to be optimum. The burner/fuel injector chosen is down-fired, and the product of combustion from each stage passes on to the next stage by means of a riser, as shown in FIG. 1.

The approximate geometry of the burner was estimated with the Thring-Newby parameter. The Richardson number, which represents the importance of natural convection relative to forced convection, was also considered in determining the appropriate geometry, so as to minimize buoyant flows, which could lead to recirculation. The Richardson number (Ri) is defined as $$Ri = \frac{g\beta(T_{het} - T_{ref})L}{V^2}. \qquad \text{Equation 2}$$

where g is gravity acceleration, L is characteristic length, V is characteristic velocity, and $\beta$ is the thermal expansion coefficient, where $$\beta = -\frac{1}{\rho}\left(\frac{\partial \rho}{\partial T}\right)_p. \qquad \text{Equation 3.}$$

For ideal gas, it can be shown that $$\beta = \frac{1}{T}. \qquad \text{Equation 4.}$$

When Ri is less than 0.1, the fluid dynamics is controlled by forced convection. On the other hand, when Ri is greater than 10, natural convection dominates. Both natural and forced convection are important for Ri between 0.1 and 10.

Figure 7:
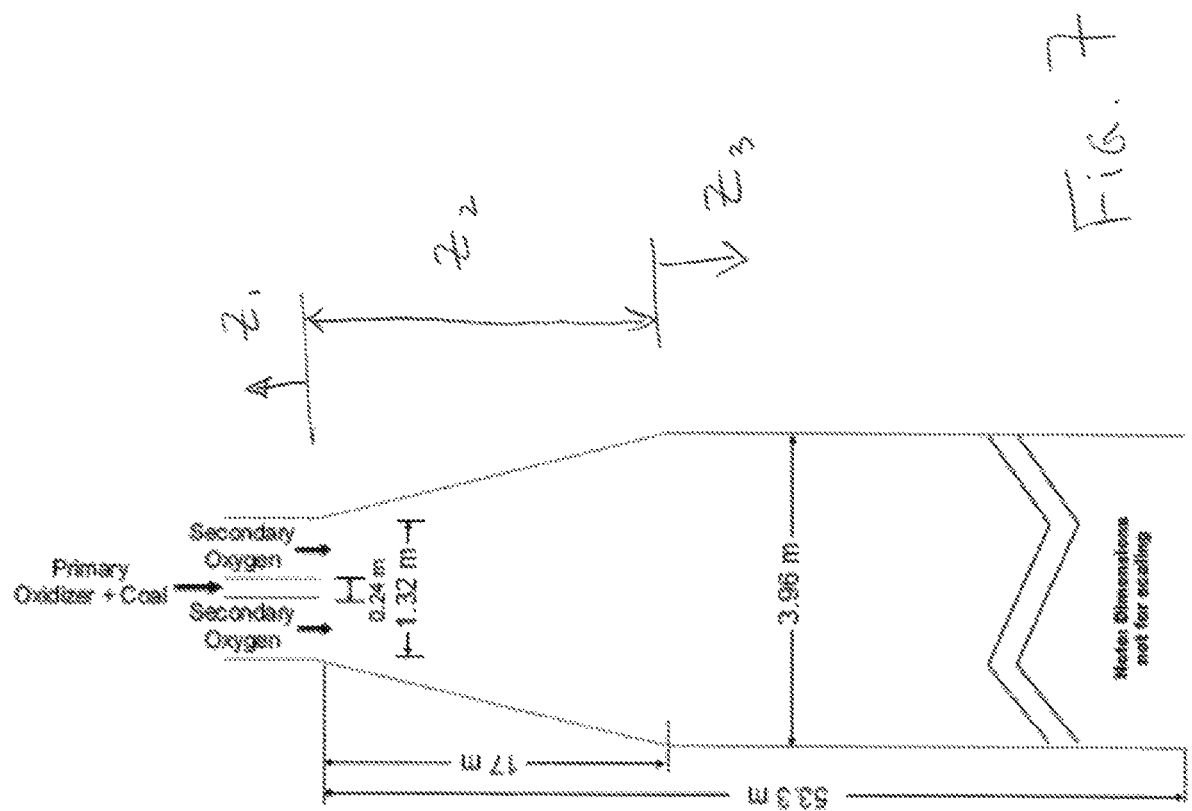
FIG. 7 illustrates the geometry of one suitable burner of SPOC.

As shown in FIG. 7, a model with PO/SO inner diameter of 0.254/1.32 m and furnace length of 53.34 m (175 ft) was applied. The furnace diameter changes gradually from 1.32 m to 3.96 m and the length of the spreading zone of the furnace is 19.8 m. As a result and as seen in FIG. 7, the shell in the combustion zone $Z_2$ of the boiler is tapered outward such that the diameter of the shell increases from the pre-combustion zone $Z_1$ to the post-combustion zone $Z_3$. In the illustrated embodiment, for example, the boiler is tapered outward along approximate 17 m of its length. It is contemplated, however, that in other suitable embodiments the boiler can be tapered along more or less of its length.

Based on the burner and boiler geometry, a 3-D 30 degree sector model was built, which took advantage of the axisymmetric character of this case. Periodic boundaries were applied on the two axisymmetric surfaces. The mesh was determined from a grid sensitivity test. The simulation results of cases with 805,000 and 1,567,000 cells were compared, and negligible differences of velocity, temperature and heat transfer were observed. Moreover, an additional case with 362,600 cells was calculated to estimate the discretization error using Richardson extrapolation (RE) method. The grid convergence index (GCI) for the case with 805,000 cells was 0.16% found by comparing key variables on the three computational meshes. Thus the mesh with 805,000 cells was used for the CFD model. FIG. 7 shows the upstream part of the mesh. A full 3-D model was also built to verify the 3-D 30 degree sector model, and after comparing the temperature, major species concentration, and wall heat flux results of these two cases, negligible differences were observed.

The properties of PRB coal used in this study are listed below in Table 1. The total thermal input for the plant is 1680 MW, with each of the four stages being 420 MW. The mass flow rates were used as boundary conditions in FLUENT for all burner inlets, as shown below in Table 2. The burner outlet was specified as a pressure outlet and the wall of the combustion chamber was maintained at 700 K with an emissivity of 1. The pressure in the chamber is 16 bar, which was determined from a SPOC economic analysis by this group in. To enhance flame stability, 25% vol $O_2$ is used in PO, while the majority of the transport gas is $CO_2$ for safety reasons. Notice that in the four-stage CFD simulations, 15% of the coal is replaced by $C_3H_8$ and char. Flame stabilization is induced by forcing some of the coal to devolatilize and treating it as a gas species (propane ($C_3H_8$)) and char.

TABLE 1

Properties of PRB coal

| Proximate analysis (% wet) | | | | Ultimate analysis (% daf) | | | | | HHV |
|---|---|---|---|---|---|---|---|---|---|
| Moisture | VM | FC | Ash | C | H | O | N | S | (MJ/kg) |
| 27.42 | 31.65 | 36.43 | 4.5 | 73.81 | 5.01 | 19.91 | 0.95 | 0.32 | 20.47 |

TABLE 2

Summary of operating conditions

| Stage | | Mass flow rate (kg/s) | $O_2$ content (vol. %) | $CO_2$ content (vol. %) | $H_2O$ content (vol. %) | Temperature (K) |
|---|---|---|---|---|---|---|
| 1 | Coal/char | 17.4/1.1 | | | | |
| | Primary stream | 4.2 | 25 | 75 | 0 | 573 |
| | Secondary stream | 120 | 100 | 0 | 0 | 573 |
| | $C_3H_8$ stream | 0.534 | | | | 300 |

TABLE 2-continued

Summary of operating conditions

| | | Mass flow rate (kg/s) | $O_2$ content (vol. %) | $CO_2$ content (vol. %) | $H_2O$ content (vol. %) | Temperature (K) |
|---|---|---|---|---|---|---|
| Stage 2 | Coal/char | 17.4/1.1 | | | | |
| | Primary stream | 4.2 | 25 | 75 | 0 | 573 |
| | Secondary stream | 143 | 63.9 | 21.1 | 14.9 | 873 |
| | $C_3H_8$ stream | 0.534 | | | | 300 |
| Stage 3 | Coal/char | 17.4/1.1 | | | | |
| | Primary stream | 4.2 | 25 | 75 | 0 | 573 |
| | Secondary stream | 167.7 | 37.2 | 36.7 | 25.9 | 873 |
| | $C_3H_8$ stream | 0.534 | | | | 300 |
| Stage 4 | Coal/char | 17.4/1.1 | | | | |
| | Primary stream | 4.2 | 25 | 75 | 0 | 573 |
| | Secondary stream | 192.4 | 16.5 | 48.8 | 34.4 | 873 |
| | $C_3H_8$ stream | 0.534 | | | | 300 |

Figure 8:
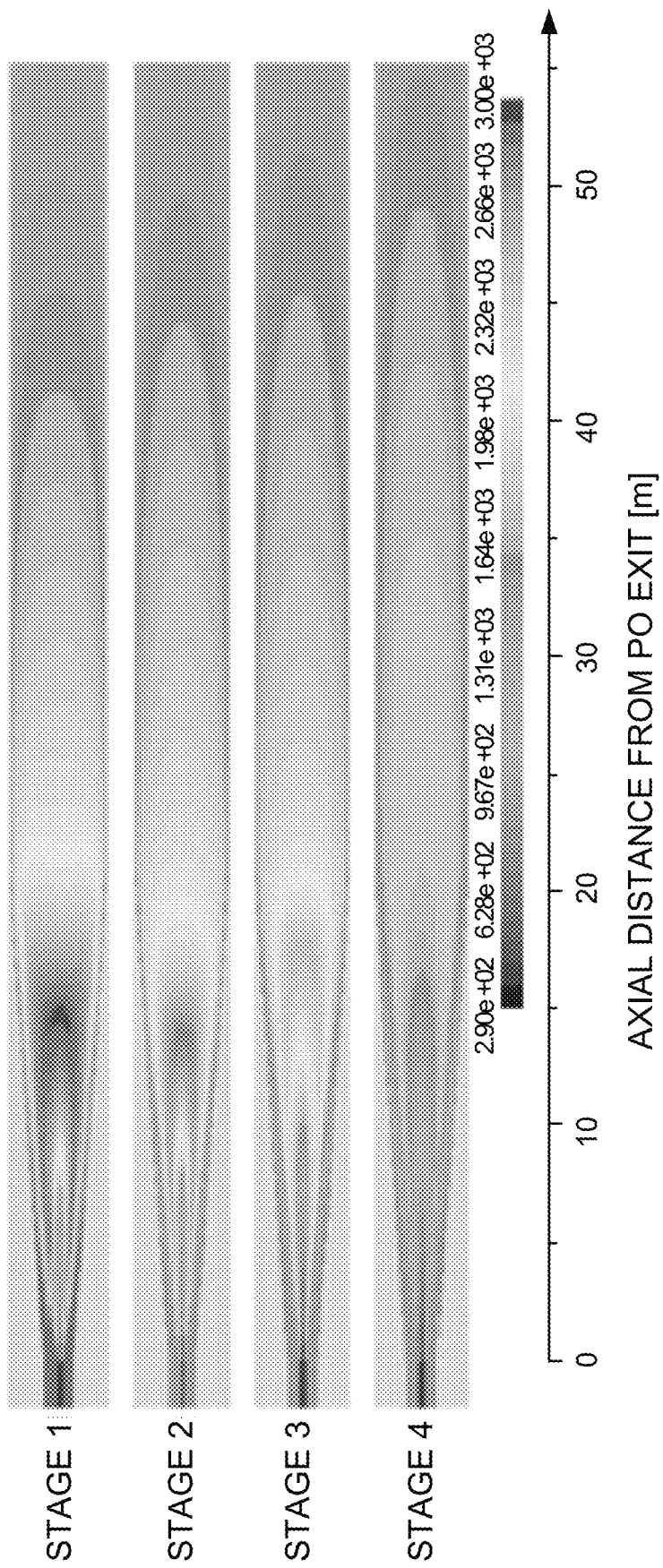
FIG. 8 shows the temperature distribution on the center cross-section of the 30-degree model through the axis for all the four stages.

FIG. 8 shows the temperature distribution on the center cross-section of the 30-degree model through the axis for all the four stages. The temperature contours exhibit typical flame patterns of jet flames. The maximum flame temperature in the first stage can be as high as 2997 K. It gradually drops to 1857 K in the fourth stage due to the dilution effect of the cooled product gases from the previous stage. Moreover, long and thin flames are observed in FIG. 8 for all four stages. This optimizes the heat transfer behavior on the wall, as demonstrated in FIG. 9, which shows the wall heat flux profiles for the four stages. The distributions of wall heat flux have a close correspondence to those of temperature. For example, in Stage 1 the maximum wall heat flux of 650 kW/m² is obtained in the region near the maximum flame temperature. The maximum wall heat flux also decreases from Stage 1 to Stage 4, as the maximum flame temperature decreases. The long and thin flames obtained in these four stages result in relatively uniform wall heat fluxes, and they are within a manageable levels, even in Stage 1.

Figure 9:
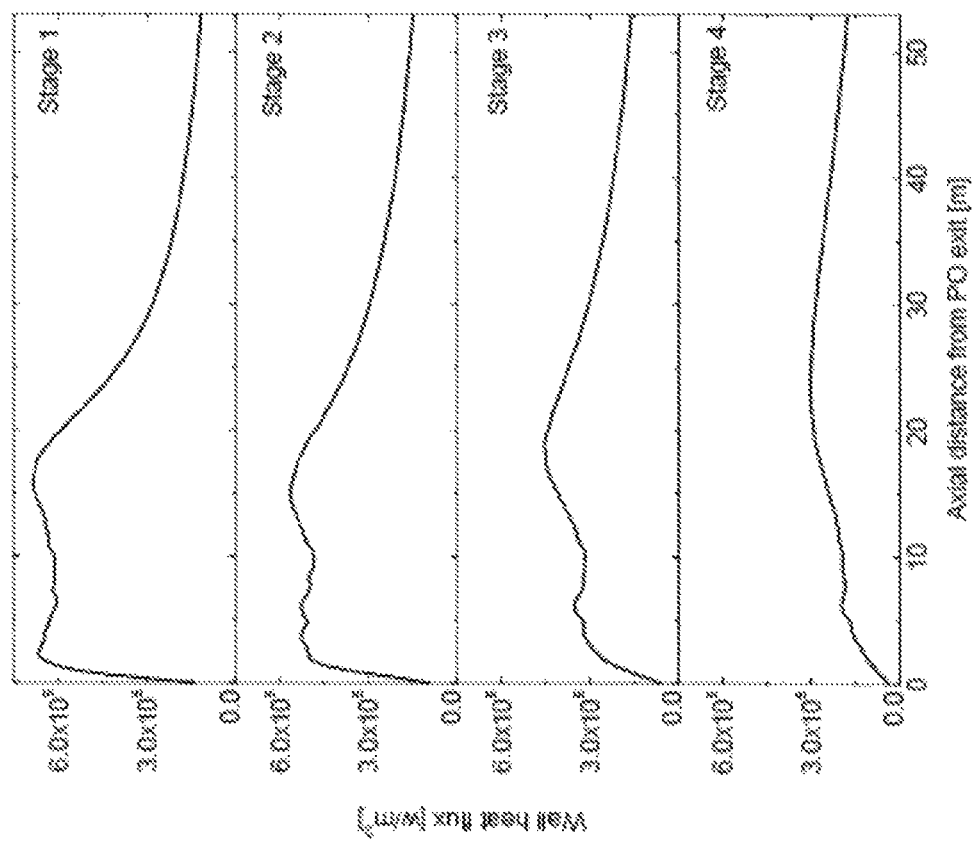
FIG. 9 shows the wall heat flux profiles for the four stages.

The results shown in FIGS. 8 and 9 indicate that with this boiler design appropriate and similar flame sizes for all four stages are achieved with manageable and relatively uniform wall heat flux.

The characteristic velocity is inversely proportional to pressure under the same mass flow rate and boiler geometry. In a pressurized system, due to the effect of $V^2$ term in Equation 2, it is imperative to study the effects of buoyancy on the flame characteristics. To fully understand the effects of buoyancy, numerical modeling was performed with and without the buoyancy effect, using a different burner design. The geometry has a PO/SO inner diameter of 0.3/3.96 m and a furnace length of 53.34 m. In this case, the SO outer diameter is the same as the furnace diameter. The case with buoyancy was carried out under down-fired conditions.

Figure 10:
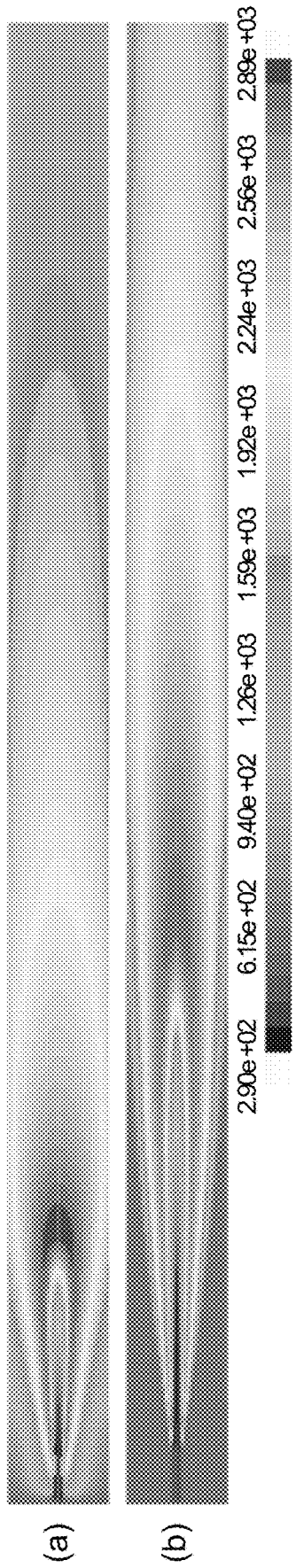
FIG. 10 shows the temperature (K) contours of stages 1 for (a) with buoyancy (b) without buoyancy.
Figure 11:
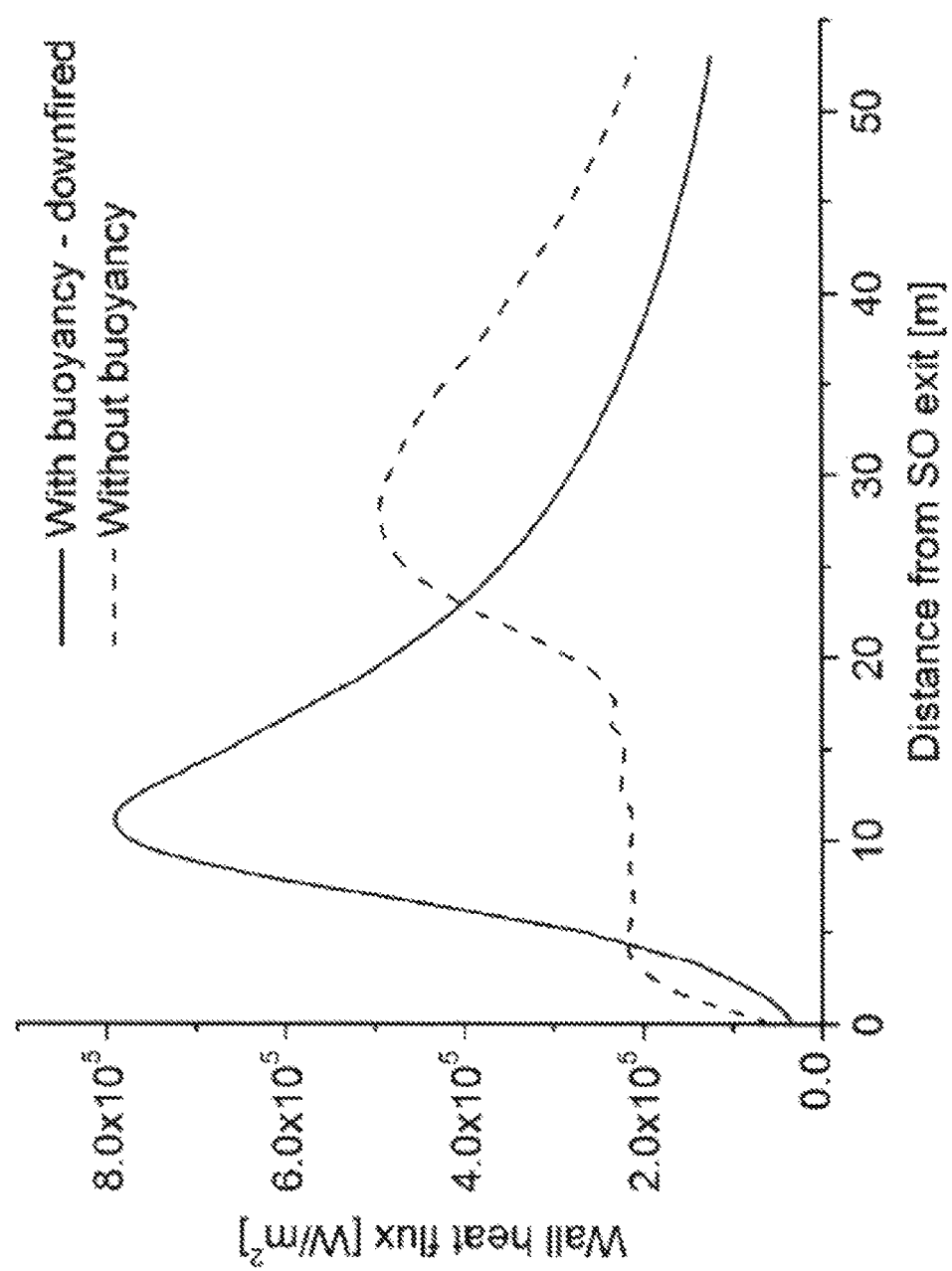
FIG. 11 shows the wall heat flux (W/m$^2$) for cases (a) with buoyancy—downfired, and (b) without buoyancy.

FIGS. 10 and 11 show a comparison between these two cases. It can be seen in FIG. 10 that case (a) has a shorter and wider flame than that of case (b) because of buoyancy. This shorter and wider flame enhances radiative, which accounts for the significant difference in wall heat flux for cases (a) and (b), as shown in FIG. 11. The case with buoyancy has a much higher maximum wall heat flux and less uniform wall heat flux along the axis than that of the case without buoyancy.

Figure 12:
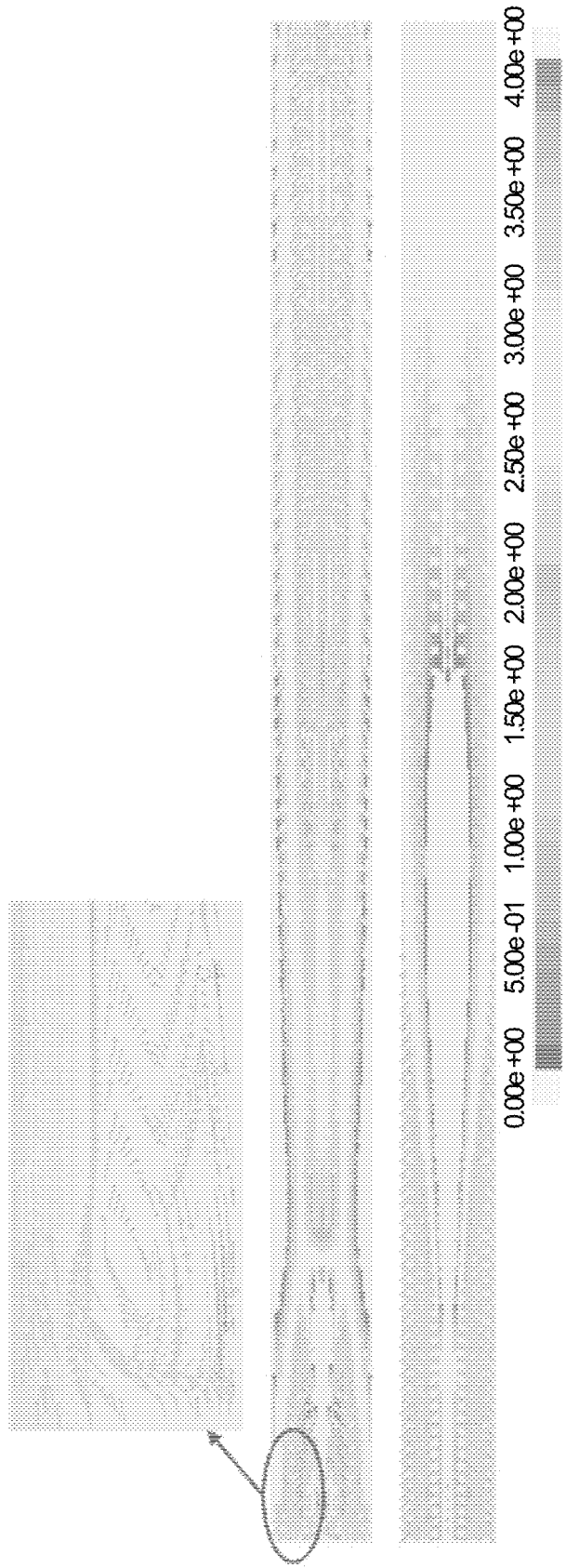
FIG. 12 shows the velocity vector (m/s) profiles for cases (a) with buoyancy, and (b) without buoyancy.

Moreover, hot gas backflow in the SO stream is observed in case (a) of FIG. 10 and buoyancy is responsible for this phenomena. The Richardson number of this burner is around 200, which implies the flow is buoyancy dominated particularly in the upstream region near the inlet where the temperatures are not uniform. FIG. 12 shows the velocity vector diagrams for cases (a) and (b). The recirculation inside the secondary tube, which is caused by hot gas backflow, is clearly shown in case (a) of FIG. 12. On the contrary, in case (b) of FIG. 12, uniform flow is observed in the secondary stream and extends downstream to give a longer and thinner flame located in the center of the furnace.

The design described above and illustrated in FIG. 7 minimizes the effects of buoyancy through appropriate choices of burner and boiler geometry. With this geometry, the Richardson number is reduced to 2.8. Also, the higher momentum in this system can help to keep the flame centered, and results in a manageable wall heat flux.

Two major advantages are obtained by utilizing the cone-shape burners in SPOC. First, compared to the design in FIG. 12, the SPOC cone-shape burner can lead to a higher local axial velocity, and thus to a higher Ri to minimize the buoyancy effect. Second, as seen in FIGS. 8 and 10, the flame in the near-burner zone is thinner than that in the downstream region. The cone-shape of burner means that the boiler tubes are closer to the flame and have higher wall heat flux as indicated in FIGS. 9 and 11. Thus, the boiler tubes are more effectively used for SPOC design with cone-shape burner.

Minimizing ash deposition is of vital importance for boiler operation. Excessive ash deposition is often the main reason for unscheduled boiler shut downs. Slagging must also be avoided as it leads to material corrosion and reduced heat transfer rate to the boiler tubes due to the higher thermal resistance of the slag layer. If slagging occurs, the furnace exit temperature and the heat transfer to the superheat cycle will be increased. Moreover, slagging formed on the furnace walls near the burner can vary the burner dynamics, which may lead to problems with flame stability. Minimizing particle deposition and slagging and avoiding corrosion are some of the major design goals for the SPOC system. As shown in the temperature contours above, the first three stages have maximum flame temperatures much higher than the typical ash fusion temperature due to the oxygen-enriched conditions. The high pressure and oxygen-enriched conditions make slagging a major concern for the SPOC system, because of potential problems with corrosion.

The extent of particle deposition on the wall is dependent on both the phase of the particles and the condition of the wall. Table 3 shows the simple, first-order deposition criterion used in this simulation.

TABLE 3

Deposition criterion

| Deposition criterion | Sticky particle | Non-sticky particle |
|---|---|---|
| Sticky wall | All deposition | Deposition if We > $We_{cr}$ |
| Non-sticky wall | Deposition if We > $We_{cr}$ | All rebound |

Particles are considered to be sticky both when the ash temperature is higher than the ash critical viscosity temperature $T_{cv}$ and when the char conversion rate is higher than 88%. The critical viscosity temperature is defined in Seggiani M., *Modelling and simulation of time varying slag flow in a Prenflo entrained-flow gasifier,* Fuel. 1998; 77:1611-21.

On the other hand, the wall surface is said to be sticky if the ash particles deposited on it are sticky. As indicated in Table 3 when both wall and particle are non-sticky, the particle will be rebounded. It has been shown that a sticky-sticky interaction will always lead to particle capture.

For the cases in which either particle or slag is in the liquid state, the sticking tendency is determined by the Weber number, which represents the importance of particle kinetic energy relative to surface tension energy. See Equation 5. Particles are captured when its Weber number is less than a critical value, which is 1.

$$We = \frac{\text{Particle kinetic energy}}{\text{Surface tension energy}}. \quad \text{Equation 5}$$

A user defined function (UDF) was made based on the theory above and input into FLUENT to calculate the deposition rate on clean furnace surface of the SPOC system. Simulation results from FLUENT show zero deposition for all four stages. This is primarily due to the absence of bulk radial flow to carry the hot particles towards the wall. Moreover, a cool wall is used in the furnace to give a low-temperature zone near the wall, and the mixing is slow, which helps cool the particles entering this zone. By having solid particles near wall, there is less chance of deposition on the wall.

The simulation results for particle deposition are based on the capture criterion assuming a clean tube surface and these results showed that no deposition occurred. To be more conservative the assumption was made that as long as the particle is molten it will deposit on the wall. FIG. 13 shows both the impaction and the deposition rate on the furnace wall for Stages 1-4. The impaction rates for all four stages are similar. For the first three stages, there are molten particles impacting on the wall between an axial distance of 10 meters and 20 meters from the PO outlet. The result of Stage 4 indicates that no particle deposition is observed. The reason is that the flame temperature in Stage 4 is so low that all particles that interact with the wall are solid.

There are sudden drops of both impaction and deposition rate at an axial distance of around 10 meters. This phenomena could be due to the repeating collisions of the same parcel of particles near the wall. When the particles are trapped in the upstream region on the furnace wall, all the downstream repeating collisions from these particles will disappear. Beyond an axial distance of about 25 meters, the impaction rate starts to increase again because particles near the wall are solid, and turbulent dispersion gradually supplies particles in the near wall region, which impacts the wall again in a repeating way.

In this study, 3-D CFD simulations were performed for the 1680 MWth staged pressurized oxy-combustion system using the RANS approach with turbulence-chemistry interaction and radiation submodels. The main conclusions are as follows:

(1) A SPOC system was designed to burn coal in pure oxygen and in a high-pressure environment with minimal flue gas recycle, that can improve efficiency and cost over first-generation oxy-fuel technologies.

(2) By staging the fuel, and thus having high stoichiometric ratio, relatively uniform and manageable wall heat fluxes can be obtained even under very high temperatures, as shown by CFD simulations.

(3) The enclosed jet theory can be used to design a combustion system with slow mixing and no external recirculation, which helped minimize ash deposition.

(4) The ash deposition calculation indicated a negligible ash deposition on the furnace wall. It showed that this is a design that can minimize particle deposition to avoid slagging, fouling, and corrosion.

(5) Buoyancy was proved to be important under the conditions of SPOC system. The geometry of the burners were improved to minimize buoyancy effects.

It was shown by this study that SPOC radiant boiler design can control heat flux and particle deposition, and that the process holds promise to minimize the cost of carbon capture from power plants.

U.S. Provisional Patent Application No. 61/830,428, filed Jun. 3, 2013, and U.S. patent application Ser. No. 14/295,018, filed Jun. 3, 2014 are hereby incorporated by reference in their entirety.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A boiler comprising:

a shell surrounding a vertical centerline, the shell defining an inner surface having an inner diameter and an inner length extending between an upper upstream end and a lower downstream end, wherein the directionality of the stream is defined with respect to combustion gas flow, the inner surface defining a hollow interior, the boiler having a pre-combustion zone, a combustion zone downstream from the pre-combustion zone, and a post-combustion zone downstream from the combustion zone, the shell being tapered outward along its length as it extends from the upper upstream end toward the lower downstream end in at least a portion of the combustion zone;

an oxidizer inlet in fluid communication with the pre-combustion zone;

a fuel nozzle for introducing fuel into the combustion zone;

a tube assembly comprising a plurality of boiler tubes mounted in the hollow interior of the shell for transferring heat to fluid flowing through the tube assembly; and a flue duct in fluid communication with the post-combustion zone for transporting flue gases from the hollow interior;

wherein the combustion zone and post-combustion zone of the boiler are encircled by a plurality of boiler tubes positioned interior to the shell.

2. The boiler of claim 1, wherein the oxidizer inlet is configured to deliver an oxidizer, wherein a stoichiometric ratio of the oxidizer is greater than or equal to 1, the stoichiometric ratio being defined as a ratio of the mass of oxygen supplied to a mass of oxygen required for stoichiometric combustion of the fuel present in said boiler.

3. The boiler of claim 2, wherein the oxidizer is introduced at a stoichiometric ratio such that the mean adiabatic flame temperature is reduced by from 1% to about 50% relative to the mean adiabatic flame temperature if the stoichiometric ratio was equal to 1.

4. The boiler of claim 2, wherein the oxidizer is introduced at a stoichiometric ratio of from 1 to 6.

5. The boiler of claim 1, wherein the pressure within the boiler is greater than ambient pressure.

6. The boiler of claim 1, wherein the fuel is a carbon-based fuel.

7. A system comprising a plurality of boilers including the boiler of claim 1 connected in series.

8. The system according to claim 7, further comprising:
a heat exchanger located downstream of the plurality of boilers; and
a direct contact cooler or condenser located after the heat exchanger.

9. The system according to claim 8, wherein nitrogen comprising and sulfur comprising byproducts are produced during the combustion of the fuel, and the bulk of said nitrogen comprising and sulfur comprising byproducts being removed in the direct contact cooler or condenser.

10. The system according to claim 7, wherein the flue gas is cooled to about 700° C. between boilers with the proviso that the system comprises at least two boilers connected in series.

11. The boiler of claim 1, further comprising a burner located in the combustion zone, said burner having a Thring-Newby parameter of greater than 0.9.

12. A method of burning carbon containing fuel, the method comprising:
introducing an oxidizer into a pre-combustion zone of a boiler having a top and a bottom;
introducing carbon-containing fuel into a combustion zone of the boiler, the boiler having a shell that is tapered outward along its length in at least a portion of the combustion zone as it extends from the top to the bottom and the combustion zone and post-combustion zone of the boiler are encircled by a plurality of boiler tubes positioned interior to the shell;
burning the oxidizer and carbon-containing fuel in the combustion zone; and
removing flue gas from a post-combustion zone of the boiler.

13. The method according to claim 12, wherein the oxidizer is oxygen.

14. The method according to claim 12, further comprising producing electricity.

15. The method according to claim 12, wherein the fuel is a carbon-based fuel.

16. The method according to claim 15, wherein the carbon-based fuel is a low rank fuel.

* * * * *